United States Patent [19]

Ichimori et al.

[11] Patent Number: 5,487,130
[45] Date of Patent: Jan. 23, 1996

[54] FUZZY RULE ACQUISITION METHOD AND APPARATUS FOR FUZZY INFERENCE SYSTEM AND FUZZY INFERENCE SYSTEM USING THE APPARATUS

[75] Inventors: Toshihide Ichimori, Kawasaki; Akira Maeda, Yokohama; Motohisa Funabashi, Sagamihara; Toshihiko Nakano, Ibaraki, all of Japan

[73] Assignee: Hitachi, Ltd., Tokyo, Japan

[21] Appl. No.: 140,665

[22] Filed: Oct. 21, 1993

[30] Foreign Application Priority Data

Oct. 22, 1992 [JP] Japan ............................ 4-284179

[51] Int. Cl.⁶ .......................... G06F 15/18; G06F 15/00
[52] U.S. Cl. ............................ 395/3; 395/51; 395/61; 395/900
[58] Field of Search ......................... 395/3, 11, 51, 395/61, 900, 906

[56] References Cited

U.S. PATENT DOCUMENTS

| | | | |
|---|---|---|---|
| 5,051,932 | 9/1991 | Inoue et al. | 364/550 |
| 5,208,898 | 5/1993 | Funabashi et al. | 395/900 |
| 5,251,285 | 10/1993 | Inoue et al. | 395/906 |
| 5,255,344 | 10/1993 | Takagi et al. | 395/3 |
| 5,263,123 | 11/1993 | Hayashi | 395/900 |
| 5,295,061 | 3/1994 | Katayama et al. | 395/900 |
| 5,305,425 | 4/1994 | Ishida et al. | 395/51 |

FOREIGN PATENT DOCUMENTS

| | | |
|---|---|---|
| 0352750A2 | of 0000 | European Pat. Off. |
| 4-127239 | of 0000 | Japan |
| 5-100859 | of 0000 | Japan |
| 3-134704 | of 0000 | Japan |
| 2-273836 | of 0000 | Japan |
| 2-273833 | of 0000 | Japan |
| 3-88001 | of 0000 | Japan |

OTHER PUBLICATIONS

Rumelhart, D. E., et al. Parallel Distributed Processing (Basic Mechanisms), "Chapter 8—Learning Internal Representations by Error Propagation," MIT Press, pp. 218–362. (provided in English).

"Application of Automatic Partial Derivative Calculation and Rounding Error Estimation to Large Scale Nonlinear Equation," Information Processing, vol. 26, No. 11, Nov. 1985, pp. 1411–1420. (provided in Japanese).

Terao, Toshiro, et al. "Introduction to Applied Fuzzy System," Ohm Ltd., pp. 25–48. (provided in Japanese).

Takagi, Hideyuki, et al. "Artificial Neural Network Driven Fuzzy Reasoning," Proceedings of International Conference on Fuzzy Logic & Neural Networks, Iizuka '88, 1988, pp. 217–218. (provided in English).

Elliot et al., "The learning aspects of the fault finder expert system"; Proceedings of the Twentieth International Symposium on Multiple-Valued Logic, pp. 378–385, 23–25 May 1990.

Primary Examiner—David K. Moore
Assistant Examiner—Tariq Rafiq Hafiz
Attorney, Agent, or Firm—Fay, Sharpe, Beall, Fagan, Minnich & McKee

[57] ABSTRACT

A fuzzy rule acquisition method for a fuzzy inference system in which a fuzzy inference is achieved based on fuzzy knowledge including fuzzy rules each described in a format having an IF part and a THEN part, and membership functions defining meanings of respective propositions described in the IF part and THEN part, and in which a fuzzy inference is performed for at least one input value by using the fuzzy rules of the fuzzy knowledge to obtain a result of the execution of the fuzzy inference, the result of the execution of the fuzzy inference is compared with a teaching value to obtain an inference error, the errors of the fuzzy rules are obtained by using the inference error, it is judged whether each of the fuzzy rules is contradictory, based on the errors of corresponding rules of the fuzzy rules, and a fuzzy rule judged as contradictory is modified to dissolve the contradiction.

15 Claims, 37 Drawing Sheets

FIG. 3 PRIOR ART

| e / Δe | NEGATIVE | 0 | POSITIVE |
|---|---|---|---|
| POSITIVE | | POSITIVE AND SMALL | NEGATIVE AND LARGE + NEGATIVE AND SMALL ~501 |
| 0 | NEGATIVE AND LARGE | 0 | POSITIVE AND LARGE |
| NEGATIVE | | NEGATIVE AND SMALL | |

BEFORE ACQUISITION 2001

ADDITION OF RULE 3   2002

MODIFICATION OF RULE 1   2003

MODIFICATION OF RULE 2   2004

| SET | X | Y | Z | TEACHING VALUE |
|---|---|---|---|---|
| 1 | 0 | 0 | 0 | 1 |
| 2 | 0 | 0 | 1 | 0 |
| 3 | 0 | 1 | 0 | 0 |
| 4 | 0 | 1 | 1 | 0 |
| 5 | 1 | 0 | 0 | 0 |
| 6 | 1 | 0 | 1 | 0 |
| 7 | 1 | 1 | 0 | 0 |
| 8 | 1 | 1 | 1 | 1 |

FIG. 25

RULE1 : IF (X=0)　　　THEN (OUTPUT=0)
RULE1 : IF (Y=0)　　　THEN (OUTPUT=0)
RULE1 : IF (Z=0)　　　THEN (OUTPUT=0)
RULE1 : IF (X=1 AND Y=1 AND Z=1)
　　　　　　　　　　　THEN (OUTPUT=0)

FIG. 26

| SET | X | Y | Z | OUTPUT |
|---|---|---|---|---|
| 1 | 0 | 0 | 0 | 0 |
| 2 | 0 | 0 | 1 | 0 |
| 3 | 0 | 1 | 0 | 0 |
| 4 | 0 | 1 | 1 | 0 |
| 5 | 1 | 0 | 0 | 0 |
| 6 | 1 | 0 | 1 | 0 |
| 7 | 1 | 1 | 0 | 0 |
| 8 | 1 | 1 | 1 | 1 |

FIG. 27

| SET | X | Y | Z | OUTPUT | TEACHING VALUE | INFERENCE ERROR |
|---|---|---|---|---|---|---|
| 1 | 0 | 0 | 0 | 0.23 | 1 | −0.77 |
| 2 | 0 | 0 | 1 | 0.23 | 0 | 0.23 |
| 3 | 0 | 1 | 0 | 0.23 | 0 | 0.23 |
| 4 | 0 | 1 | 1 | 0.23 | 0 | 0.23 |
| 5 | 1 | 0 | 0 | 0.23 | 0 | 0.23 |
| 6 | 1 | 0 | 1 | 0.23 | 0 | 0.23 |
| 7 | 1 | 1 | 0 | 0.23 | 0 | 0.23 |
| 8 | 1 | 1 | 1 | 0.71 | 1 | −0.29 |

FIG. 28

| RULE | RULE ERROR |
|---|---|
| 1 | 0.0 |
| 2 | 0.0 |
| 3 | −0.16 |
| 4 | −0.20 |

FIG. 29

| INPUT PROPOSITION | INPUT PROPOSITION GRADE | INPUT PROPOSITION ERROR |
|---|---|---|
| X=0 | 1.0 | 0.0 |
| X=1 | 0.0 | 0.0 |
| Y=0 | 1.0 | 0.0 |
| Y=1 | 0.0 | 0.0 |
| Z=0 | 1.0 | 0.0 |
| Z=1 | 0.0 | −0.19 |

FIG. 30

| OUTPUT PROPOSITION | OUTPUT PROPOSITION GRADE |
|---|---|
| OUTPUT=0 | −0.16 |
| OUTPUT=1 | 0.0 |

FIG. 31

| SET | X | Y | Z | OUTPUT | TEACHING VALUE | INFERENCE ERROR |
|---|---|---|---|---|---|---|
| 1 | 0 | 0 | 0 | 0.43 | 1 | −0.57 |
| 2 | 0 | 0 | 1 | 0.23 | 0 | 0.23 |
| 3 | 0 | 1 | 0 | 0.23 | 0 | 0.23 |
| 4 | 0 | 1 | 1 | 0.23 | 0 | 0.23 |
| 5 | 1 | 0 | 0 | 0.23 | 0 | 0.23 |
| 6 | 1 | 0 | 1 | 0.23 | 0 | 0.23 |
| 7 | 1 | 1 | 0 | 0.23 | 0 | 0.23 |
| 8 | 1 | 1 | 1 | 0.71 | 1 | −0.29 |

FIG. 32

| RULE | RULE ERROR |
|---|---|
| 1 | 0.0 |
| 2 | 0.0 |
| 3 | 0.09 |
| 4 | 0.0 |
| 5 | −0.10 |

FIG. 33

| SET | X | Y | Z | OUTPUT | TEACHING VALUE | INFERENCE ERROR |
|---|---|---|---|---|---|---|
| 1 | 0 | 0 | 0 | 0.71 | 1 | −0.29 |
| 2 | 0 | 0 | 1 | 0.23 | 0 | 0.23 |
| 3 | 0 | 1 | 0 | 0.23 | 0 | 0.23 |
| 4 | 0 | 1 | 1 | 0.23 | 0 | 0.23 |
| 5 | 1 | 0 | 0 | 0.23 | 0 | 0.23 |
| 6 | 1 | 0 | 1 | 0.23 | 0 | 0.23 |
| 7 | 1 | 1 | 0 | 0.23 | 0 | 0.23 |
| 8 | 1 | 1 | 1 | 0.71 | 1 | −0.29 |

| TRAINING DATA | INFERENCE OUTPUT | TEACHING VALUE | INFERENCE ERROR |
|---|---|---|---|
| 1 | 0.43 | 1 | −0.57 |
| 2 | 0.23 | 0 | 0.23 |
| 3 | 0.23 | 0 | 0.23 |
| 4 | 0.23 | 0 | 0.23 |
| 5 | 0.23 | 0 | 0.23 |
| 6 | 0.23 | 0 | 0.23 |
| 7 | 0.23 | 0 | 0.23 |
| 8 | 0.71 | 1 | −0.29 |

3301

| TRAINING DATA | INFERENCE OURPUT | TEACHING VALUE | INFERENCE ERROR | |
|---|---|---|---|---|
| 1 | 0.43 | 1 | −0.57 | SELECTED DATA DISPLAY 3501 |
| 2 | 0.23 | 0 | 0.23 | |
| 3 | 0.23 | 0 | 0.23 | |
|   |      | 0 | 0.23 | |
|   |      | 0 | 0.23 | |
|   |      | 0 | 0.23 | |
|   |      | 0 | 0.23 | |
|   |      | 1 | −0.29 | |

INFERENCE INPUT DATA : 1

| x | y | z |
|---|---|---|
| 0.54 | 0.7 | 2.1 |

INFERENCE INPUT DATA DISPLAY 3502

FIG. 40

| MODIFIED RULE | RULE BEFORE MODIFICATION |
|---|---|
| RULE 3 : IF(Z=0)<br>THEN(OUTPUT=0) | IF(Y=1 AND X=0) OR (Z=1 AND X=0)<br>THEN(OUTPUT=0) |

MODIFIED RULE DISPLAY 3702 / RULE BEFORE MODIFICATION DISPLAY 3701

| REASON OF MODIFICATION | |
|---|---|
| RULE / RULE ERROR<br>1 / 0.0<br>2 / 0.0<br>3 / 0.09<br>4 / 0.0<br>5 / −0.10 | CONTRADICTION BETWEEN RULES 3 AND 5<br><br>3704<br>MODIFICATION REASON DATA DISPLAY |

3705 MODIFICATION REASON DISPLAY

FIG. 41

ADDITIONAL RULE DISPLAY 3801 / NEARBY RULE DISPLAY 3802

| ADDITIONAL RULE | NEARBY RULE |
|---|---|
| RULE5 : IF(Z=0)<br>THEN(OUTPUT=0) | RULE1 : IF(X=0)<br>THEN(OUTPUT=0)<br>RULE2 : IF(Y=0)<br>THEN(OUTPUT=0)<br>RULE3 : IF(Z=0)<br>THEN(OUTPUT=0) |

REASON OF GENERATING ADDITIONAL RULE

| RULE | RULE ERROR |
|---|---|
| 1 | 0.0 |
| 2 | 0.0 |
| 3 | −0.16 |
| 4 | −0.20 |

| OUTPUT PROPOSITION | OUTPUT PROPOSITION ERROR |
|---|---|
| OUTPUT=0 | −0.16 |
| OUTPUT=1 | 0.0 |

| INPUT PROPOSITION | INPUT PROPOSITION GRADE | INPUT PROPOSITION ERROR |
|---|---|---|
| X=0 | 1.0 | 0.0 |
| X=1 | 0.0 | 0.0 |
| Y=0 | 1.0 | 0.0 |
| Y=1 | 0.0 | 0.0 |
| Z=0 | 1.0 | 0.0 |
| Z=1 | 0.0 | −0.19 |

ADDITIONAL RULE GENERATOR REASON DATA DISPLAY 3803

MODIFIED CONTENT DISPLAY 3901

| MODIFIED |
|---|
| RULE1 : IF((Y=1 AND X=0) OR (Z=1 AND X=0) THEN(OUTPUT=0)<br>RULE2 : IF((X=1 AND Y=0) OR (Z=1 AND Y=0) THEN(OUTPUT=0)<br>RULE3 : IF((X=1 AND Z=0) OR (Y=1 AND Z=0) THEN(OUTPUT=0)<br>RULE4 : IF(X=1 AND Y=1 AND Z=1)          THEN(OUTPUT=0)<br>RULE5 : IF(X=0 AND Y=0 AND Z=0)          THEN(OUTPUT=1) |
| BEFORE MODIFICATION   KNOWLEDGE BASE DISPLAY 3902 |
| RULE1 : IF(Y=1 AND X=0)                   THEN(OUTPUT=0) |

RULE BEFORE MODIFICATION DISPLAY 3903

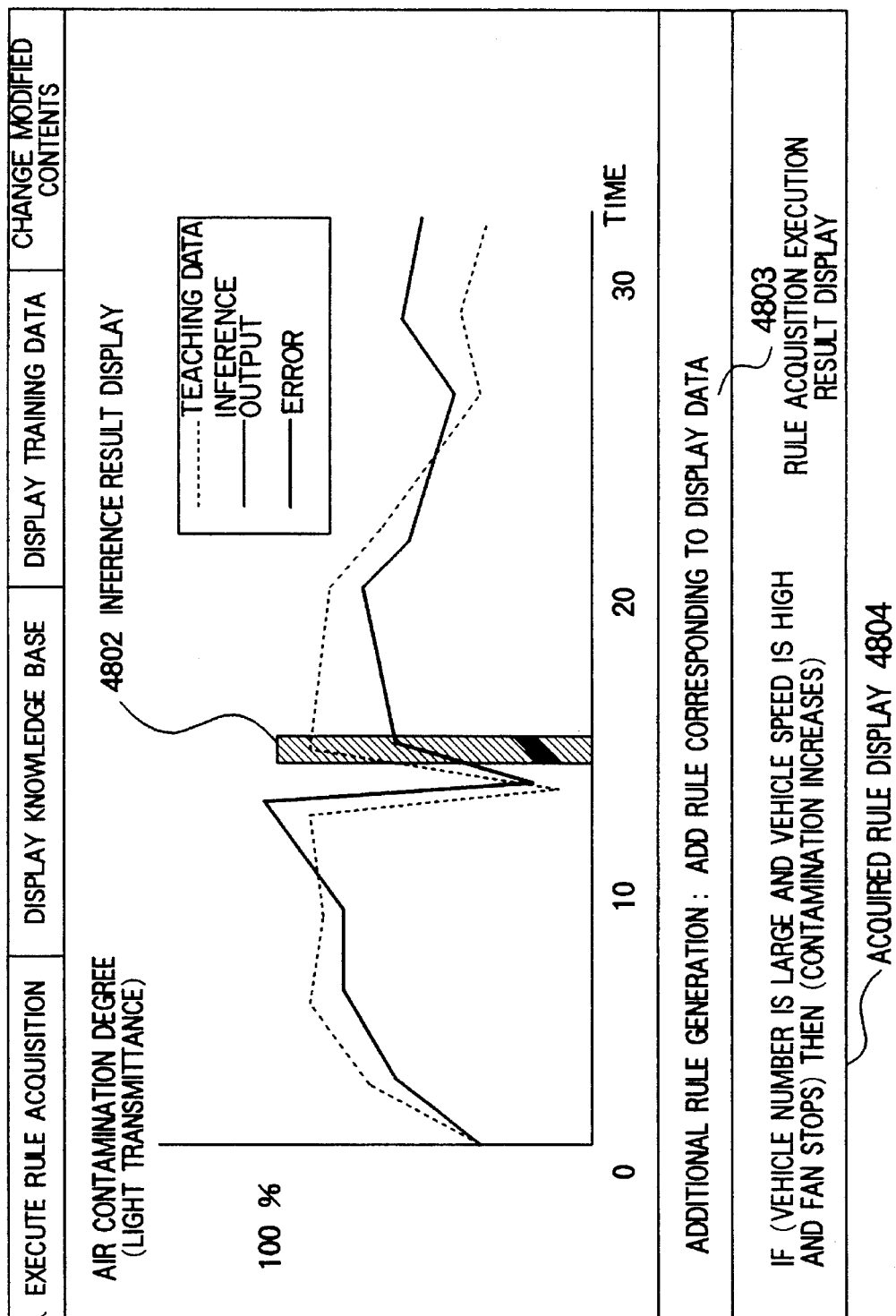

FUZZY RULE ACQUISITION METHOD AND APPARATUS FOR FUZZY INFERENCE SYSTEM AND FUZZY INFERENCE SYSTEM USING THE APPARATUS

BACKGROUND OF THE INVENTION

1. Field of the Invention

The present invention relates to a fuzzy inference system applied to the fields of information processing and control, and more particularly to a fuzzy rule acquisition method and apparatus for a fuzzy inference system, and a fuzzy inference system using the apparatus.

2. Description of the Related Art

Recently, systems using fuzzy inference have been developed more and more, mainly in the control field such as a subway automatic operation system and a tunnel ventilation control system. Fuzzy inference is a method of estimating an output relative to an inference input, by using fuzzy rules and membership functions derived from human experience and knowledge. The details of fuzzy inference are described, for example, in "Introduction to Applied Fuzzy System", by Toshiro TERAO, Kayoji ASAI, and Michio SUGANO, Ohm Ltd., pp. 36–48. The definition of a general fuzzy inference method will be described by referring to the method described in "Introduction to Applied Fuzzy System", pp. 36–39. FIG. 1 is a flow chart explaining the operation of fuzzy inference, and FIG. 2 is a schematic diagram explaining the principle of fuzzy inference. In the following description, the two rules given below are used.

Rule 1: IF [(x1 is small) AND (x2 is medium)] THEN (y1 is medium).

Rule 2: IF [(x1 is large) AND (x2 is small)] THEN (y1 is large).

For the fuzzy inference, first at Step 301 each condition part (IF part) proposition grade is computed for the inference inputs x1 and x2 (corresponding to the process by a block 401 shown in FIG. 2). Then, at Step 302 a MIN operation of the respective condition part proposition grades for each rule is performed to compute a condition part grade (corresponding to a block 402 of FIG. 2). At Step 303 the condition part grade is multiplied by an output proposition to obtain each rule grade (corresponding to a block 403 of FIG. 2). At Step 304 a MAX operation of inference output variables is performed at each section to obtain a total grade (corresponding to a block 404 of FIG. 2). An operation for the center of gravity is performed for the respective total grades to obtain a final inference output (corresponding to a block 405 of FIG. 2).

A fuzzy rule is simply called a rule hereinafter. Typical techniques of acquiring a rule are described in JP-A-3-88001 "Fuzzy PI Apparatus" (hereinafter called first conventional technique), "ARTIFICIAL_NEURAL_NETWORK_DRIVEN-FUZZY REASONING", by Hideyuki TAKAGI, Isao HAYASHI, Proceedings of International Conference on Fuzzy Logic & Neural Networks IIZUKA '88, pp. 217–218, 1988 (hereinafter called second conventional technique), JP-A-4-127239 "Method of Automatically Tuning Fuzzy Inference Parameter and Method of Displaying Training Conditions" (hereinafter called third conventional technique), and JP-A-5-100859 "Fuzzy Inference Apparatus with Inference Control Mechanism and Training Method" (hereinafter called fourth conventional technique).

According to the first conventional technique, a rule is defined for an area without a rule, by using already prepared rules and membership functions. For example, it is assumed that the following five rules have been defined for fuzzy inference input variables e and e.

IF (e is positive) AND (Δe is 0) THEN (Output is positive and large).

IF (e is 0) AND (Δe is 0) THEN (Output is 0).

IF (e is negative) AND (Δe is 0) THEN (Output is negative and large).

IF (e is 0) AND (Δe is negative) THEN (Output is negative and small).

IF (e is 0) AND (Δe is positive) THEN (Output is positive and small).

In the rule description, "0", "positive", and "negative" correspond to membership functions, and "positive and large", "negative and large", "positive and small", and "negative and small" correspond to real numbers. The details of the membership functions and real numbers are omitted herein. According to the definition of fuzzy inference, after the respective total grades are obtained by the MAX operation, an algebraic sum for respective rules is computed to obtain an inference output.

Areas corresponding to these rules are shown in FIG. 3. As shown, there are some areas without a rule.

The known rules Ri0 and R0j are assumed to be given by:

Ri,0: IF (e is Ei) AND (Δe is ΔE0) THEN (Output is Ai), and

R0,j: IF (e is E0) AND (Δe is ΔEj) THEN (Output is Bi), where i, j=(0, 1, −1),

ΔE0: "0", ΔE1: "positive", ΔE-1: "negative",

E0: "0", E1: "positive", E-1: "negative",

A0: "0", Ai: "positive and large", A-1: "negative and large", and

B0: "0", Bi: "positive and small", B-1: "negative and small.

A rule at an empty area is extended as in the following:

Ri,j: IF (e is Ei) AND (Δe is ΔEj) THEN (Output is Ai+Bj).

For example, if (i, j)=(1, 1), the rule is extended to:

IF (e is positive) AND (Δe is positive) THEN (Output is positive and small+positive and large).

In this manner, even for an area without a defined rule, a new rule can be extended by using already prepared membership functions and rules, and a proper inference output can be obtained which is equivalent to the performance of a general PI control (proportional plus integral control).

The second conventional technique concerns about a method of acquiring a rule by using a training ability of an artificial neural network (hereinafter simply called neural network). The structure of the neural network of the second conventional technique is shown in FIG. 4. Reference numeral 607 represents inference inputs, reference numeral 602 represents a neural network for computing an IF part grade (membership function) of each rule by using the inference inputs, reference numerals 603 to 605 represent neural networks for computing an output value of the THEN part of each rule by using the inference inputs.

A flow chart of acquiring a rule according to the second conventional technique is shown in FIG. 5. For the rule acquisition, at Step 701 an inference output Yi (0≦i≦number of outputs) and inference input Xi (0≦i≦number of inputs) are selected and assigned to each input/output of the neural networks. At Step 702 there is prepared a training data set including inference input data and teaching data which is a desired output.

At Step 703 the prepared training data is divided into clusters corresponding to respective rules by using a known clustering method. Assuming that the training data is divided into r clusters A1, A2, . . . , Ar, the number of rules is r.

At Step 704 the neural network 602 shown in FIG. 4 performs a learning operation for computing the IF part grade of each rule. The neural network 602 has all membership functions of the rules. The training data is given to the input/output of this neural network to perform the learning operation. The neural network training operation is performed by the back propagation method detailed, for example, in "Parallel Distributed Processing", by D. E. Rumelhurt, MIT Press, pp. 318–362. Representing the inference input data by Xi and the teaching data by Y*I as the i-th training data, applied to the input of the neural network is the inference input Xi, and used as the teaching data Wij of the neural network is:

$Wij =$ 0: $(Xi, Y^*i)$ is not included in $Aj$
1: $(Xi, Y^*i)$ is included in $Aj$, where i represents the i-th training data, and j represents data corresponding to the rule j (cluster Aj).

At Step 705 the neural networks 603 to 605 shown in FIG. 4 perform learning operations for computing the THEN part output values of respective rules. The inference input data and teaching data of each cluster are given to the input and output of the corresponding neural network.

At Steps 704 to 705 the learning operations are completed at the neural network which receives the inference input and outputs the IF part grade of each rule and at the neural networks which output the THEN part of each rule. For the fuzzy inference, a fuzzy input is supplied to the neural network 602 which computes the grade Wi of each IF part, and the neural networks 603 to 605 compute the output Oi of each THEN part. The final inference output is given by the following equation:

Output=$\Sigma WiOi/\Sigma Wi$

According to the third conventional technique, the fuzzy inference is expressed by a computation network called FLIP-net (Fuzzy Logic Inference Procedure Network), and a neural network learning method is applied to this network to automatically tune the shape of a membership function.

A FLIP-net for the fuzzy inference using the following two rules is shown in FIG. 6.

Rule 1: IF (x1 is small) AND (x2 is medium) THEN (y1 is medium).

Rule 2: IF (x1 is large) AND (x2 is small) THEN (y1 is large).

Each link indicates the descriptions of each proposition and rule and the flow of inference, forming a right hand directed graph, and each node corresponds to fuzzy inference computation which includes the following five operations.

1. Computing the grade (membership function) of a proposition.
2. Computing the grade of an IF part.
3. Computing the grade of a rule.
4. Computing the total grade.
5. Computing the center of gravity (output). Fuzzy inference is performed by routing the FLIP-net from the left to the right.

The extended back propagation method (extended BP method) is the back propagation method applied to a FLIP-net, the back propagation method being a neural network learning method. The back propagation method is detailed, for example, in "Parallel Distributed Processing", by D. E. Rumelhurt, MIT Press, pp. 318–362. With the extended BP method, after the execution of fuzzy inference, an output value and teaching value are compared to calculate an output error, and the shape parameter of a membership function is modified so as to reduce the output error. Used as the correction amount of each shape parameter is a partial differential coefficient of a fuzzy inference output relative to the shape parameter multiplied by an output error.

If delivery of a composite function is used, the partial differential coefficient of an inference output and a shape parameter takes finally a product of partial differential coefficients at respective nodes along the inference path on the FLIP-net. Specifically, in obtaining the correction amount of a shape parameter, the output error obtained by fuzzy inference is propagated back along the path from the output node to the membership function node. In back propagating an output error, the output error is multiplied sequentially by partial differential coefficients at respective nodes. The final value propagated back to a membership function is the correction amount of the membership function. It is possible to automatically tune a membership function at a high speed by computing the correction amount on a FLIP-net by the extended BP method.

An example of the structure of the fourth conventional technique is shown in FIG. 7. This fourth technique is characterized in that while a fuzzy inference is performed, an inference control unit 4405 adaptively changes the membership function shape, the rule weight representing the importance degree of each rule, and the like, in accordance with the input proposition grade. In the example shown in FIG. 7, a rule weight stored in a rule weight storage unit 4407 is changed in accordance with an input proposition grade computed by an input proposition grade computation unit 4403. The relationship between the input proposition grade and rule weight is learnt by using as the inference control mechanism a multi-layer perceptron or single-layer perceptron which is one type of neural networks. Examples of the multi-layer perceptron and single-layer perceptron are shown in FIGS. 8 and 9.

In actual learning, after the execution of fuzzy inference, the correction amount of a membership function shape parameter and the correction amount of a fuzzy rule weight are computed by using a FLIP-net and the extended BP method described with the third conventional technique. Learning is performed by giving input proposition grades to input nodes 4601 of the multi-layer perceptron of the inference control unit and by giving the correction amounts to output neurons 4604. If a three-layer neural network is used, learning is performed by the back propagation method.

The neural network and the learning method for neural network are detailed, for example, in "Parallel Distributed Processing", by D. E. Rumelhurt, MIT Press, pp. 318–362.

If fuzzy inference is executed after the neural network learning, the rule weight and the like can be adaptively changed in accordance with an input proposition grade. Fuzzy inference is therefore performed by using a fuzzy rule weight suitable for an input proposition, providing precise inference.

If a single-layer perceptron is used as the neural network and the correlative learning is used as the neural network learning, the weight 4502 of a link of the neural network after the learning indicates the intensity of correlation between an input and output. Therefore, if the input proposition grades of fuzzy inference are applied to the inputs of the neural network and the correction amounts of fuzzy rule weights are applied to the outputs, the weights of links of the neural network indicate the intensities of correlation between input propositions and rules. Accordingly, if input propositions and rules having a high correlation are selected and the input propositions are applied to the IF parts, a new rule can be generated.

SUMMARY OF THE INVENTION

With the first conventional technique, a new rule is added by checking one combination of prepositions after another. Therefore, if a number of propositions and rules increases, the efficiency of rule acquisition becomes very poor. Extending a rule is performed through interpolation between nearby rules. A rule unable to be acquired by interpolation, such as a rule 501 enclosed by a broken line in FIG. 3, cannot be acquired by the method of the first conventional technique.

Also with the first conventional technique, if there is a rule with deficiency, this deficiency cannot be detected and dissolved. If there is a rule with deficiency, extending a rule by using such a deficient rule is absolutely meaningless. Rule acquisition and rule deficiency dissolution not applied to the first conventional technique are therefore performed by a trial and error basis by a user, considerably lowering the efficiency of rule acquisition.

With the second conventional technique, a rule is acquired by using a learning ability of a neural network. The learning by a neural network is performed by providing an input and output data and processing them in a predetermined method. There is therefore the disadvantage that experience, knowledge, request, and the like of a user associated with an object to be inferred cannot be reflected directly upon rule acquisition. If there is an error or deviation in training data, the neural network learns such error or deviation as it is. This cannot be checked easily by a user because the neural network is a black box.

Because of the black box, the linguistic knowledge representation by an IF-THEN rule, which is a characteristic feature of fuzzy inference, is obtained insufficiently. Therefore, a user unfamiliar with a neural network cannot understand how a rule has been acquired, posing a problem of difficult check, test, and maintenance of the system.

With the third conventional technique, although the shape of a membership function can be tuned, it provides no function of acquiring a rule.

With the fourth conventional technique, if a three-layer network is used as a neural network, the problem of the black box like the second conventional technique occurs. If a single-layer network is used, only an ability to check the correlation between a grade and error is provided. Therefore, if a plurality of correlations are to be checked, it is impossible to acquire a rule.

It is a first object of the present invention to provide an automatic rule acquisition method and apparatus capable of solving the problems of the first conventional technique and improving the efficiency of acquiring a rule.

It is a second object of the present invention to provide a fuzzy rule acquisition method and fuzzy inference apparatus capable of solving the problems of the second conventional technique, allowing the rule acquisition operation to proceed with the addition, modification, and deletion of an IF-THEN rule given by linguistic knowledge representation, allowing a user to easily understand the process and result of rule acquisition, reflecting experience, knowledge, request, and the like of a user upon a rule at each process during rule acquisition to thereby acquire a rule desired by a user.

It is a third object of the present invention to provide a user interface capable of allowing a user to monitor the rule acquisition operation easily, and if necessary, reflecting experience, knowledge, request, and the like of the user upon the rule and rule acquisition operation.

It is a fourth object of the present invention to detect, if any deficiency is found in fuzzy inference, a rule with deficiency by quantitatively evaluating the fuzzy inference, to judge whether the deficiency has resulted from a rule contradiction or from a abundant/mission rule, to dissolve a rule deficiency, if any, by modifying a rule, to generate, if there is a missing rule, an additional rule through the evaluation of propositions of already present rules, and to delete a redundant rule, if any, thereby improving the efficiency of the operations of dissolving contradictory rules, adding a missing rule, deleting a redundant rule, these operations having been performed conventionally by a user on the trial and error basis. The rule acquisition operation proceeds with the addition, modification, and deletion of an IF-THEN format rule. A user may be provided with information of a series of operations, if desired, to allow the user to interactively perform the operations including detecting a rule contradiction and a redundant/missing rule, modifying a rule to dissolve a rule contradiction, generating a missing rule, and deleting a redundant rule.

The rule contradiction means that a pair of rules having opposite conclusions satisfies a certain inference input at the same time. Namely, the rule contradiction represents the state where a pair of rules having opposite conclusion parts influences the inference output to the same degree. A redundant rule is a rule not necessary for the fuzzy inference. A missing rule is a rule by which some error is present between the fuzzy inference output value and a teaching value which is a desired output.

It is a fifth object of the present invention to solve the problems of the third conventional technique, to not only tune a membership function but also acquire a rule, to commonly use part of the membership function tuning method and part of the rule acquisition method to thereby economize the storage area of a computer and shorten the computation time when both the membership function tuning and rule acquisition are performed at the same time.

It is a sixth object of the present invention to solve the problems of the fourth conventional technique, and to allow a rule to be acquired even in a complicated case where it is necessary to check the correlation between a plurality of grades and correction amounts.

According to an aspect of the present invention, there is provided a fuzzy rule acquisition method for a fuzzy inference system in which a fuzzy inference is achieved based on fuzzy knowledge including fuzzy rules each described in a format having an IF part and a THEN part, and membership functions defining meanings of respective propositions described in the IF part and THEN part, the fuzzy rule acquisition method includes the steps of:

(a) performing a fuzzy inference for at least one input value by using the fuzzy rules of the fuzzy knowledge, and obtaining a result of the execution of the fuzzy inference;

(b) comparing the result of the execution of the fuzzy inference with a teaching value, and obtaining an inference error;

(c) obtaining the errors of the fuzzy rules by using the inference error;

(d) judging whether each of the fuzzy rules is contradictory, based on the errors of corresponding rules of the fuzzy rules; and (e) modifying a fuzzy rule judged as contradictory to dissolve the contradiction.

According to one example of the present invention, the step (d) includes a step of comparing the errors of each pair of fuzzy rules among all pairs of the fuzzy rules, and a step of judging each pair of fuzzy rules as contradictory fuzzy rules if a ratio between the errors of each pair of fuzzy rules is within a predetermined range and one of the errors is negative and the other of the errors is positive.

According to another example of the present invention, the step (e) includes a step of comparing the areas corresponding to the IF parts of each pair of fuzzy rules judged as contradictory, and a step of modifying the IF part of the fuzzy rule judged as having a larger area by the comparison result.

According to another example of the present invention, the method further includes:

a step of judging that there is a missing fuzzy rule if the step (d) judges that there is no contradiction for all of the fuzzy rules;

a step of obtaining ones of the errors and grades of the respective propositions based on the inference error; and a step of, if it is judged that there is a missing fuzzy rule, generating the missing fuzzy rule based on ones of the errors and grades of the respective propositions.

According to another example of the present invention, the method further includes the steps of:

obtaining ones of the errors and grades of the respective propositions based on the inference error;

if it is judged that there is a missing rule, selecting IF parts based on ones of the errors and grades of the prepositions of the respective IF parts of the fuzzy rules; and coupling the selected IF parts to generate the IF part of the missing fuzzy rule.

According to another example of the present invention, the method further includes the steps of;

obtaining the errors of the respective propositions based on the inference error;

if it is judged that there is a missing rule, selecting a THEN part based on the errors of the prepositions of the respective THEN parts of the fuzzy rules; and determining the selected THEN part as the THEN part of the missing fuzzy rule.

According to another example of the present invention, the method includes:

a step of judging as a redundant fuzzy rule a fuzzy rule among the fuzzy rules not used for the fuzzy inference, and deleting the fuzzy rule judged as the redundant fuzzy rule.

According to another aspect of the present invention, there is provided a fuzzy rule acquisition method for a fuzzy inference system in which a fuzzy inference is achieved based on fuzzy knowledge including fuzzy rules each described in a format having an IF part and a THEN part, and membership functions defining meanings of respective propositions described in the IF part and THEN part, the fuzzy rule acquisition method includes the step of:

acquiring a fuzzy rule by using a procedure of tuning at least one of the membership functions and the fuzzy rule acquisition method, wherein the procedure of tuning at least one of the membership functions includes the steps of:

(A) performing a fuzzy inference for at least one input value by using the fuzzy rules of the fuzzy knowledge, and obtaining a result of the execution of the fuzzy inference;

(B) comparing the result of the execution of the fuzzy inference with a teaching value, and obtaining an inference error;

(C) obtaining the errors of the prepositions by using the inference error;

(D) obtaining a correction amount of a shape parameter of at least one of the membership functions based on the errors of the prepositions; and (E) tuning the shape of the at least one of the membership functions based on the correction amount.

According to one example of the present invention, an input value and a teaching value which is a desired output are given for fuzzy inference, a fuzzy inference output value is computed from the input value by using fuzzy knowledge, the errors of respective propositions and rules are computed from the output value and teaching value, it is checked from the errors whether there is any rule contradiction, a rule with deficiency to be dissolved is detected, and the area of the rule to be modified is identified. In this manner, the number of conventional operations on the trial and error basis required for the identification of the area to be modified, can be considerably reduced, improving the efficiency of the rule acquisition operation.

According to another example of the present invention, if a rule with deficiency is detected, the rule is modified to dissolve the deficiency by referring to the grades and/or errors of respective propositions and rules used during the fuzzy inference. If a redundant rule is detected, the redundant rule is deleted from the knowledge base. If a missing rule is detected, a new rule is generated by referring to the grades and/or errors of respective propositions and rules, and added to the knowledge base. In this manner, without the trial and error basis, the addition, modification, and deletion of a rule is possible, efficiently performing the rule acquisition operation. The rule acquisition operation proceeds with the addition, modification, and deletion of an IF-THEN format rule, so that a user can easily understand the rule acquisition process and the acquired rule.

According to another example of the present invention, if a pair of contradictory rules is detected during the rule acquisition operation, a user is provided with a redundant rule if any, and in the case of a missing rule if any, with the missing rule and rules partially duplicating the missing rule (rules in the inclusion relationship to the missing rule). In addition, a user is provided with processed data such as errors which are the reason for the rule contradiction or abundant/missing rule.

According to another example of the present invention, at the time of detecting a rule contradiction and dissolving the contradiction by modifying a rule, a user is provided with the modified area of the rule and the rule before the modification.

According to another example of the present invention, a user is provided with a redundant rule if it is detected and is to be deleted.

According to another example of the present invention, a user is provided with an additional rule if a missing rule is detected and a new rule is to be generated and added to the knowledge base.

According to another example of the present invention, a user is provided with processed data such as errors which are the reason for generating an additional rule, modifying a rule, or deleting a rule.

According to another example of the present invention, an input from a user is accepted, if desired, and in accordance with the input, the contents of the operations are modified or the operations are terminated, the operations including generating an additional rule, modifying a rule, and deleting a rule. A series of rule acquisition operations together with the reason for each operation are provided to a user, allowing the user to understand the rule acquisition process easily. Even if an erroneous rule is acquired because of an error or deviation of teaching data, a user can check this easily. A user can stop or modify the rule acquisition operation through the judgement by provided error information. It is therefore possible to reflect the experience, knowledge, request, and the like of a user upon the rule acquisition operation, and to efficiently acquire a rule desired by the user.

According to another example of the present invention, it is possible to perform at the same time both the membership function automatic tuning and the rule acquisition. In this case, part of the membership function automatic tuning method and part of the rule acquisition method can be used in common. Therefore, the membership function tuning and the rule acquisition can be performed with less computation resources and time than they are performed singularly.

According to another example of the present invention, the rule acquisition operation which has been conventionally performed on the trial and error basis, can be performed automatically, improving the efficiency of acquiring a rule.

According to the rule acquisition method of the present invention, the rule acquisition operation proceeds with the addition, modification, and deletion of an IF-THEN rule given by a linguistic knowledge representation, allowing a user to easily understand the process and result of rule acquisition and facilitating the check, test, and maintenance of the final fuzzy inference system. In addition, the experience, knowledge, request, and the like of a user can be reflected upon a rule at each process during the rule acquisition operation to thereby acquire a rule desired by the user.

According to the fuzzy inference system of the present invention, both the membership function automatic tuning and the rule acquisition can be performed at the same time, considerably reducing the labor required for configuring the fuzzy inference system.

BRIEF DESCRIPTION OF THE DRAWINGS

FIG. 3 is a diagram explaining rule acquisition and an example of a rule unable to be acquired, according to the first conventional technique;

FIG. 25 shows initial rules used by the rule acquisition method of the first embodiment;

FIG. 26 is a table showing the input and output data for the initial rules used by the rule acquisition method of the first embodiment;

FIG. 27 is a table showing the fuzzy inference results for the initial rules used by the first embodiment;

FIG. 28 is a table showing the errors of the initial rules used by the first embodiment;

FIG. 29 is a table showing grades and errors for the initial rules used by the first embodiment;

FIG. 30 is a table showing the errors of output propositions for the initial rules used by the first embodiment;

FIG. 31 is a table showing the fuzzy inference results after the first rule acquisition according to the first embodiment;

FIG. 32 is a table showing the rule errors after the first rule acquisition according to the first embodiment;

FIG. 33 is a table showing the fuzzy inference results after the completion of the rule acquisition according to the first embodiment;

FIG. 40 shows examples of a display of a modified fuzzy rule, a display of a rule before modification, and a display of the reason for modification, according to the second embodiment;

FIG. 41 shows examples of a display of generation results of a missing fuzzy rule, a display of rules near the additional rule, and a display of the reason for generating the additional rule, according to the second embodiment;

FIG. 48 shows an example of a display of an acquired rule by the fuzzy rule acquisition apparatus of the forth embodiment.

DESCRIPTION OF THE PREFERRED EMBODIMENTS

Figure 1:
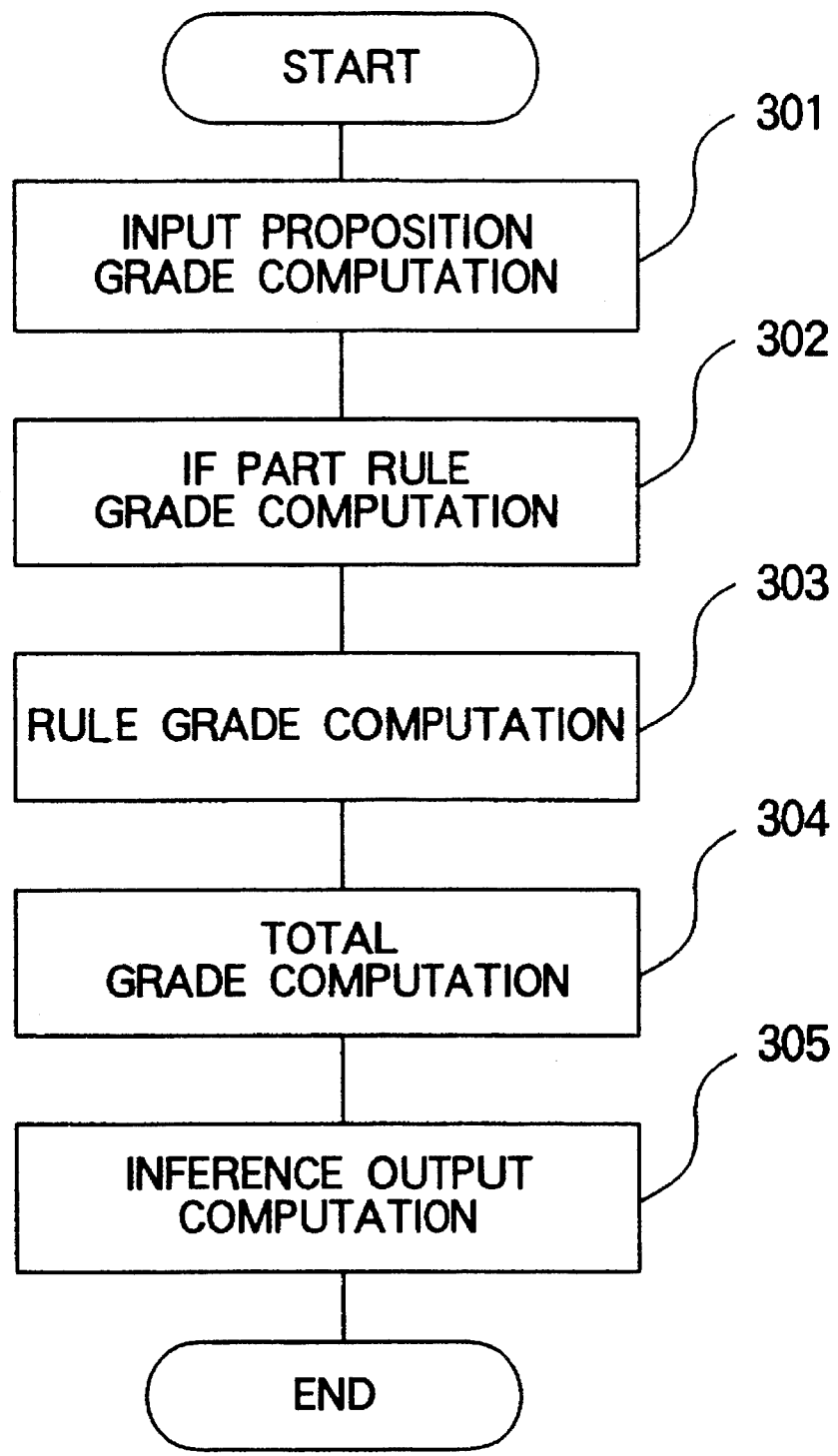
FIG. 1 is a flow chart showing the procedure of general fuzzy inference.
Figure 2:
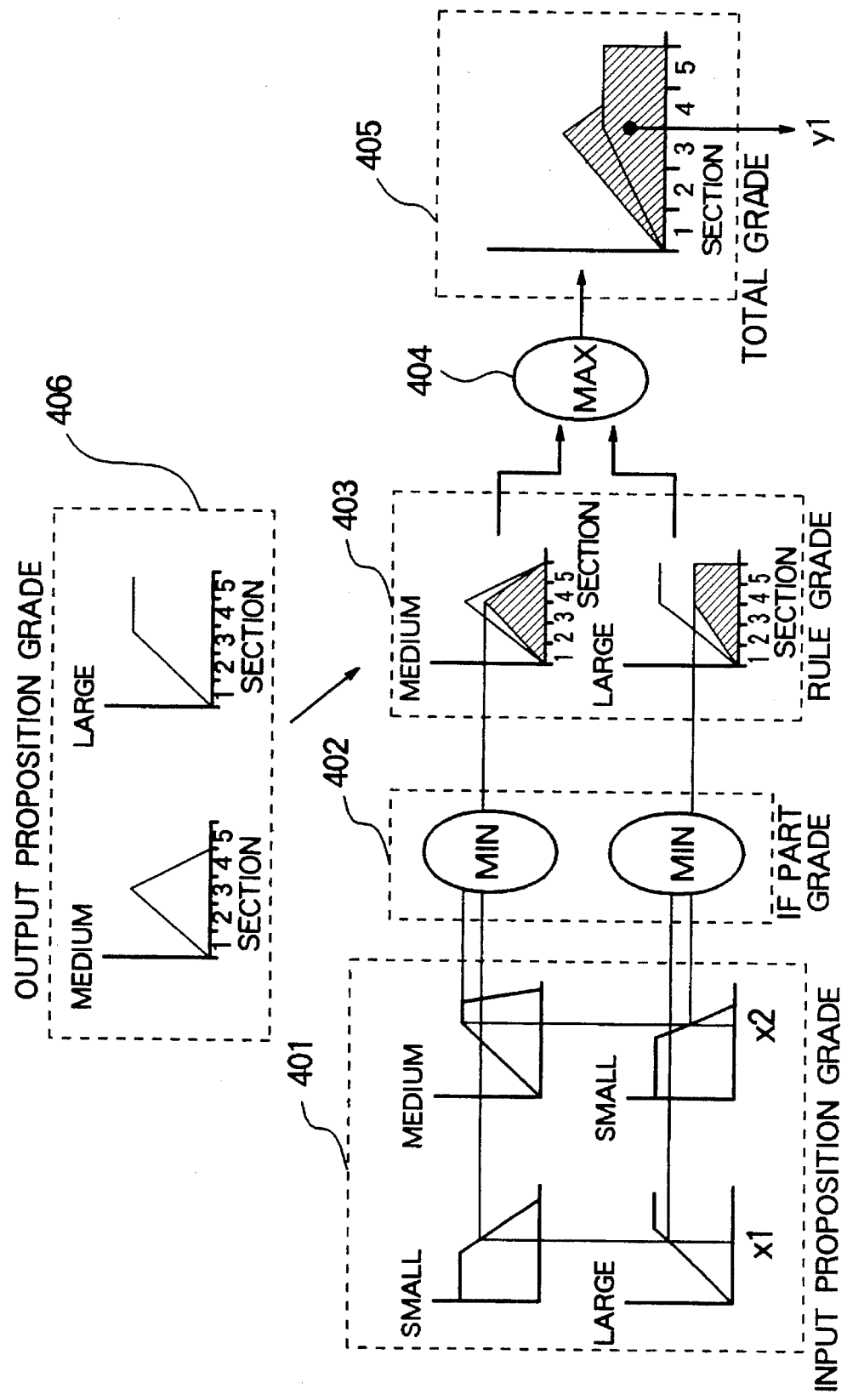
FIG. 2 is a diagram explaining the principle of the procedure of general fuzzy inference.
Figure 4:
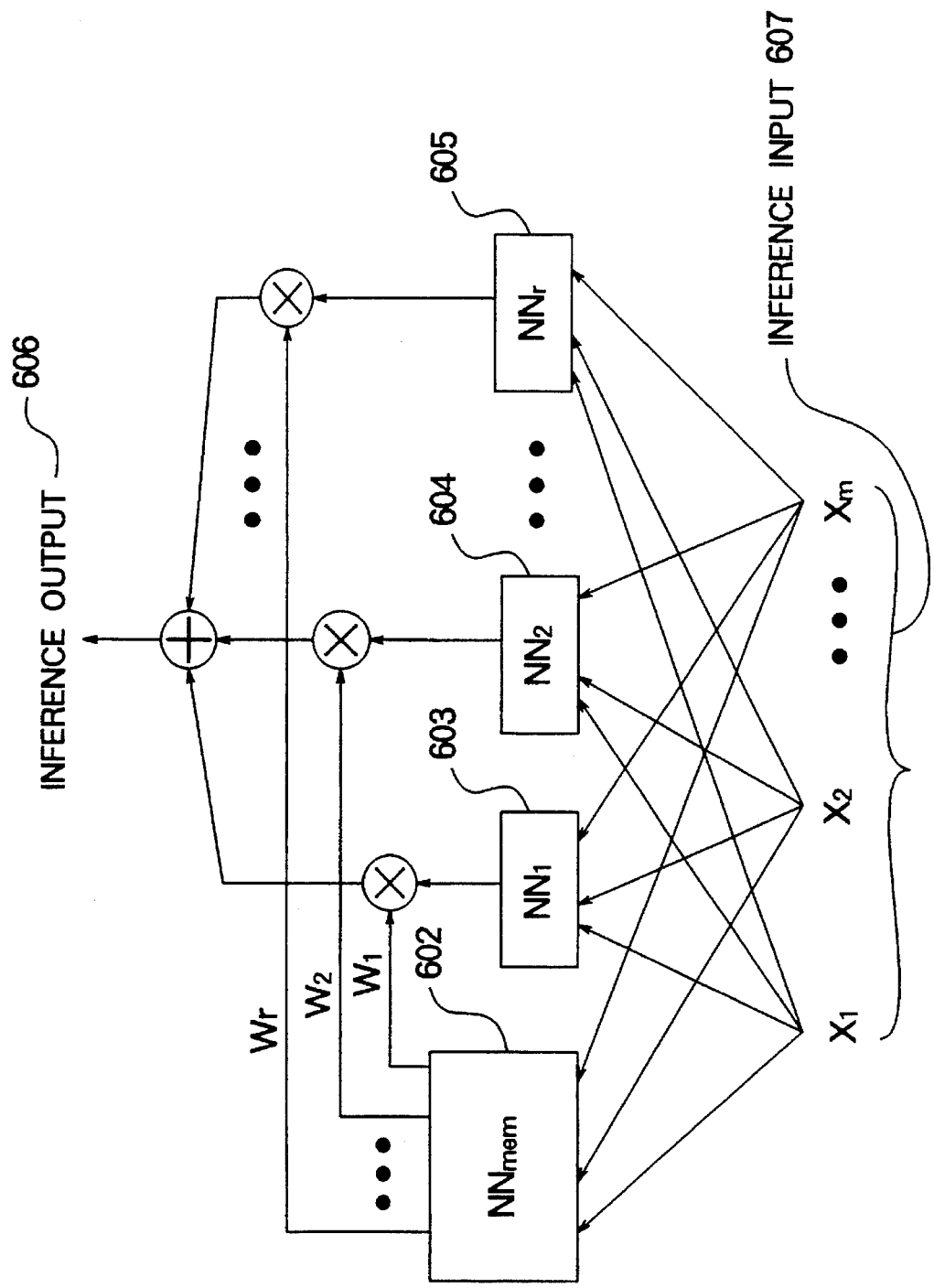
FIG. 4 is a diagram explaining a rule acquisition method according to the second conventional technique.
Figure 5:
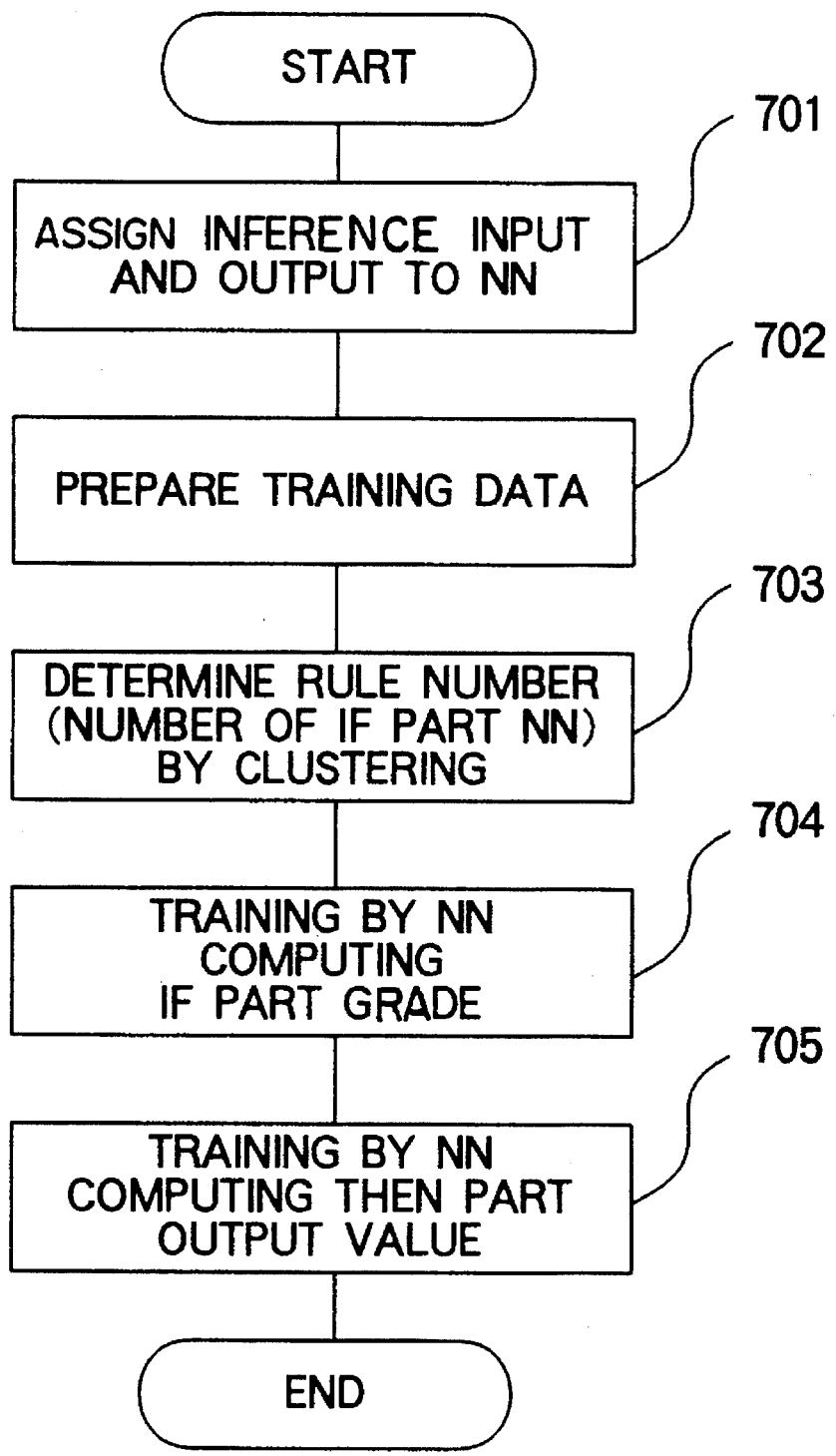
FIG. 5 is a flow chart explaining the procedure of the rule acquisition method according to the second conventional technique.
Figure 6:
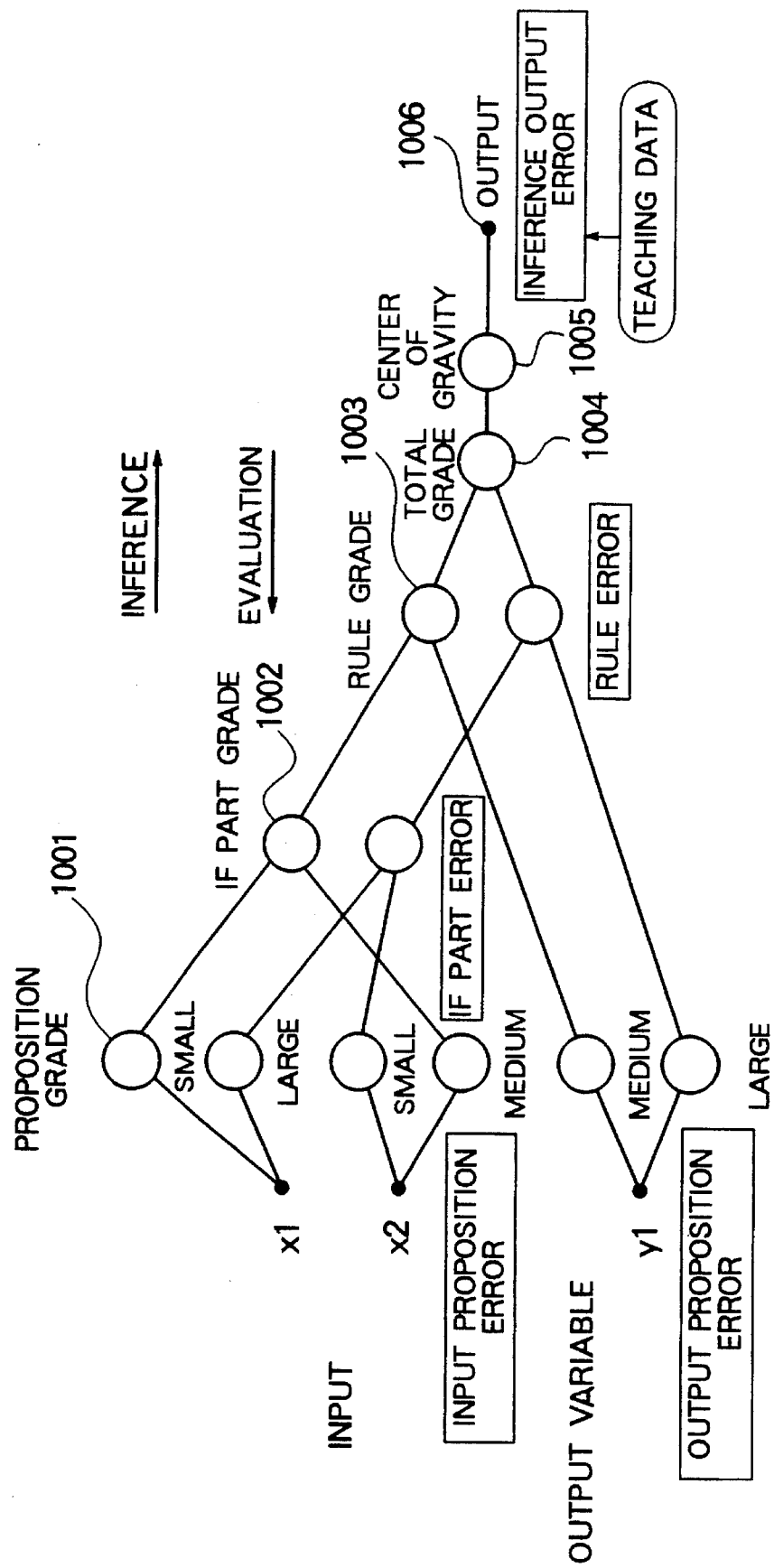
FIG. 6 is a diagram explaining the principle of a fuzzy inference network used for membership function automatic tuning, according to the third conventional technique.
Figure 7:
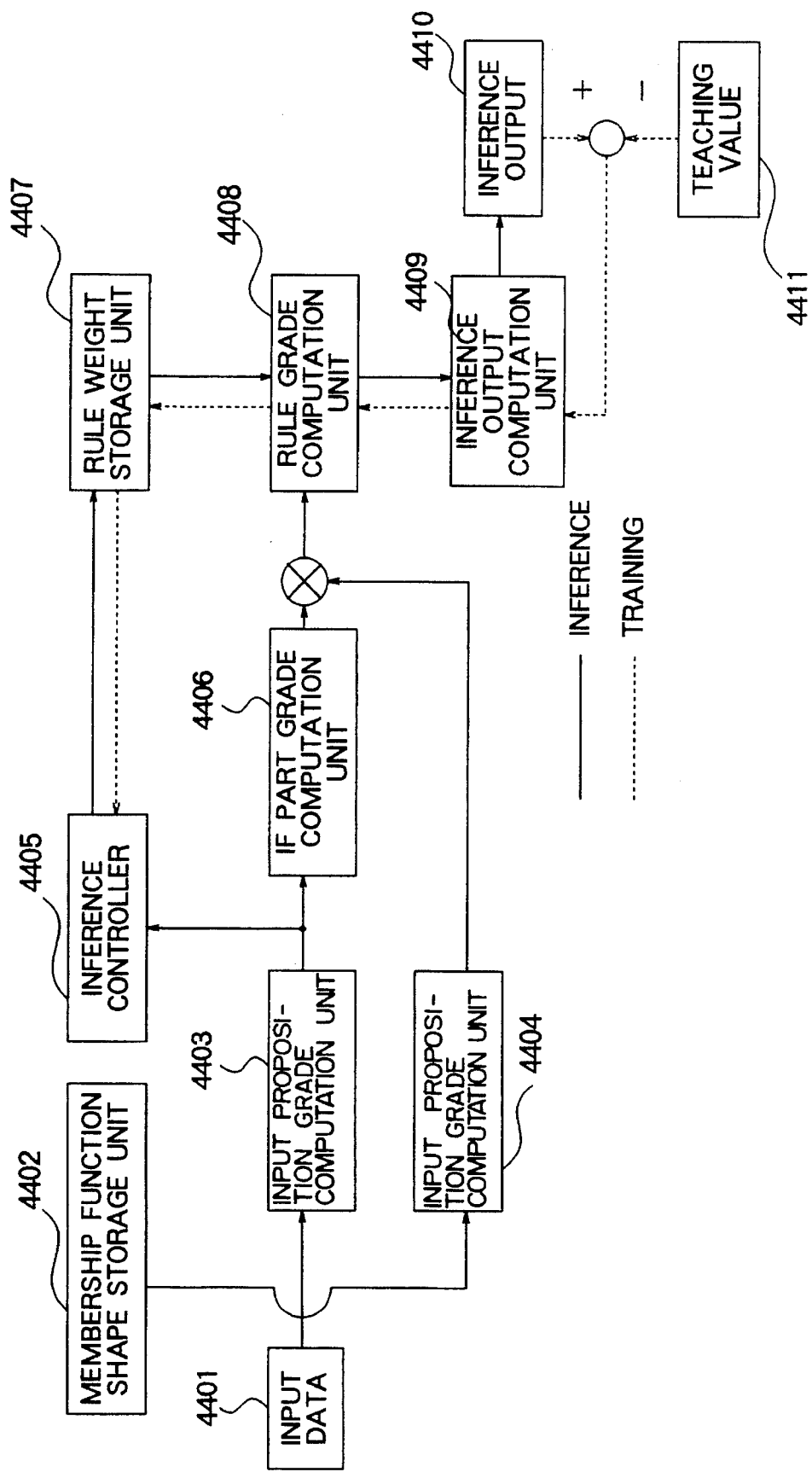
FIG. 7 shows the structure of a fuzzy inference apparatus according to the fourth conventional technique.
Figure 8:
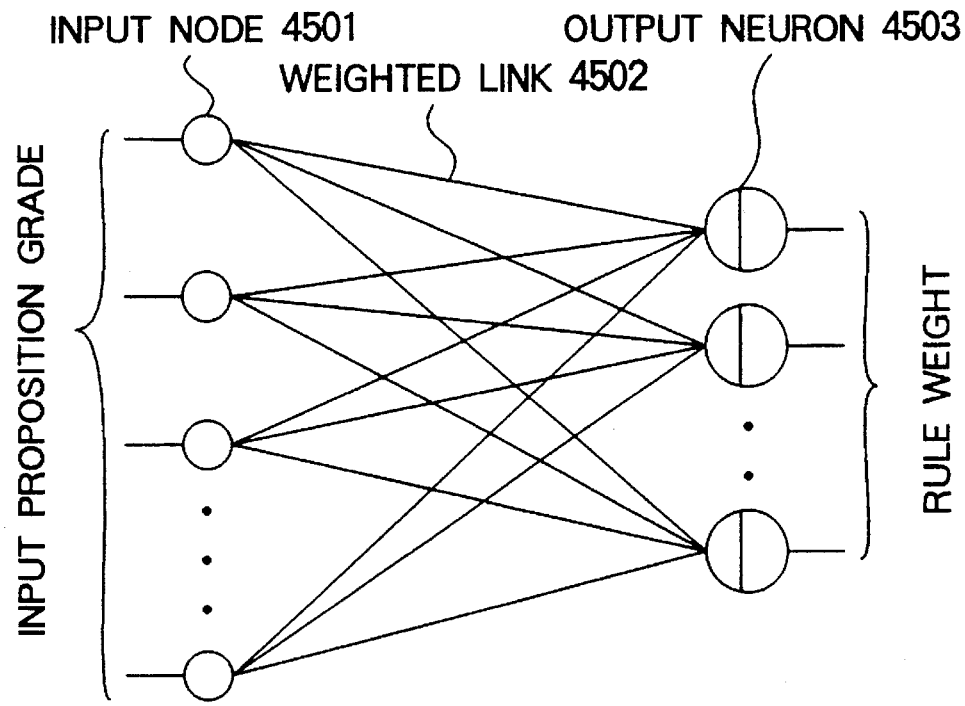
FIG. 8 is a diagram explaining the principle of a single-layer perceptron used by the inference control unit of the fuzzy inference apparatus according to the fourth conventional technique.
Figure 9:
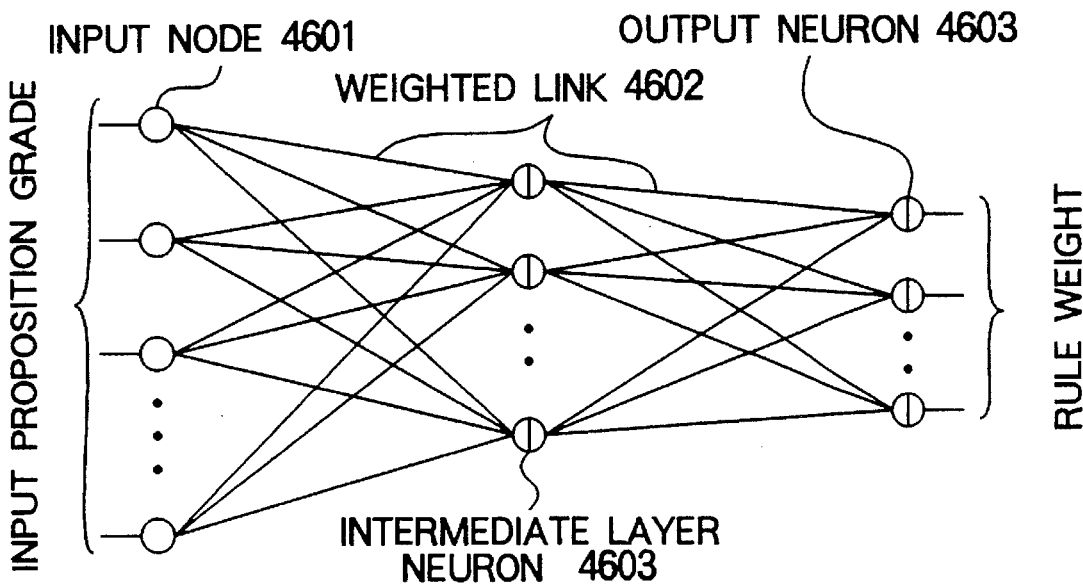
FIG. 9 is a diagram explaining the principle of a multi-layer perceptron used by the inference control unit of the fuzzy inference apparatus according to the fourth conventional technique.

Embodiments of the present invention will be described. Elements having identical reference numerals in the accompanying drawings are assumed to have the same functions. The principle of a rule acquisition method will be described first, and then the operation of this method will be described by using a simple model. In the following embodiments, the definition of fuzzy inference follows the method described in "Introduction to Applied Fuzzy System", pp. 36–39 cited previously. However, the invention is not limited to this definition, but other known definitions may be used such as using an algebraic product sum as the IF part grade operation and an algebraic sum as the compositional operation (summation), which are detailed in "Introduction to Applied Fuzzy System", pp. 25–35, and p. 41. Also, in the following embodiments, although the description of rule weighting is omitted for the purpose of description simplicity, the invention is applicable to the rule acquisition method with rule weighting.

Figure 11:
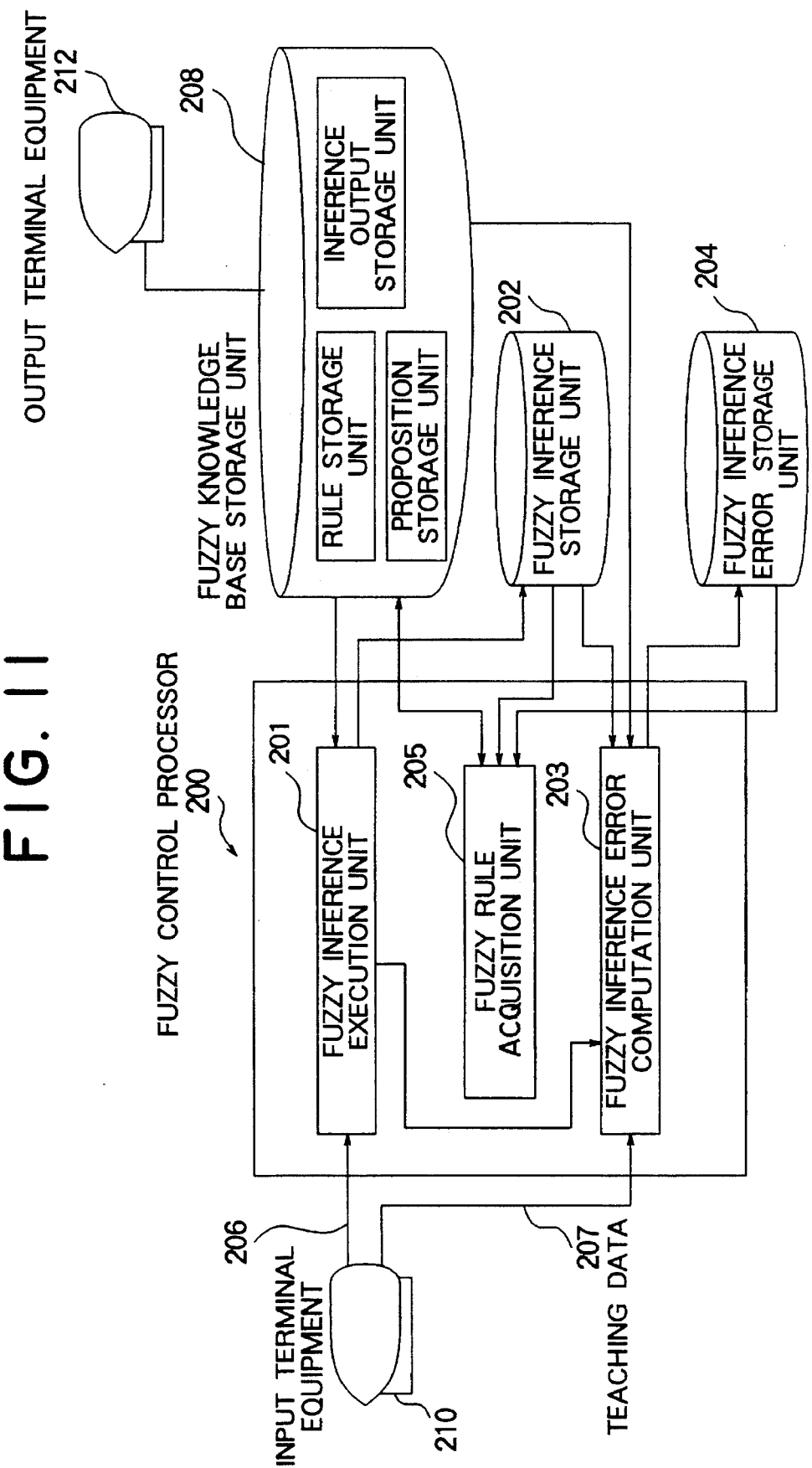
FIG. 11 is a block diagram showing an example of the structure of a fuzzy rule acquisition apparatus of the first embodiment.

A fuzzy rule acquisition method according to a first embodiment of the present invention will first be described. FIG. 11 is a block diagram showing an example of the structure of a fuzzy rule acquisition apparatus according to the first embodiment. This apparatus has a fuzzy control processor 200, an input terminal equipment 210, an output terminal equipment 212, a fuzzy knowledge base storage unit 208, a fuzzy inference storage unit 202, and a fuzzy inference error storage unit 204. The fuzzy knowledge base storage unit 208 includes a rule storage unit, a proposition storage unit, and an inference output storage unit. The fuzzy control processor 200 includes unrepresented CPU and memories (such as ROM and RAM). A RAM, for example, has a fuzzy inference execution unit 201, a fuzzy rule acquisition unit 205, and a fuzzy inference error computation unit 203, these units being configured by microprograms or program modules. The input terminal equipment 210 has, for example, a display, and a keyboard and/or mouse. The output terminal equipment 212 has, for example, a display and a keyboard. A single terminal equipment may be shared by both the input and output terminal equipments. The units 201 to 203 may be structured by hardware as will be later described.

The fuzzy inference execution unit 201 receives input data sets 206 entered from the input terminal equipment 210, i.e., inputs to be inferred (hereinafter called inference inputs), executes fuzzy inference by using fuzzy knowledge stored in the fuzzy knowledge base storage unit 208 to obtain objective outputs, i.e., the execution results of the fuzzy inference (hereinafter called inference outputs), and stores rules, proposition grades (proposition fitness values), inference results, and the like in the fuzzy inference storage unit 202. The fuzzy error computation (inference evaluation) unit 203 computes fuzzy inference errors between respective inference outputs and teaching data (teaching values) 207 which are desired inference outputs entered from the input terminal equipment 210. The computed errors are stored in the fuzzy inference error storage unit 204. In accordance with the grades, errors, and the like stored in the fuzzy inference storage unit 202 and fuzzy inference error storage unit 204, the fuzzy rule acquisition unit 205 executes the addition, modification, and deletion of fuzzy rules.

Figure 12:
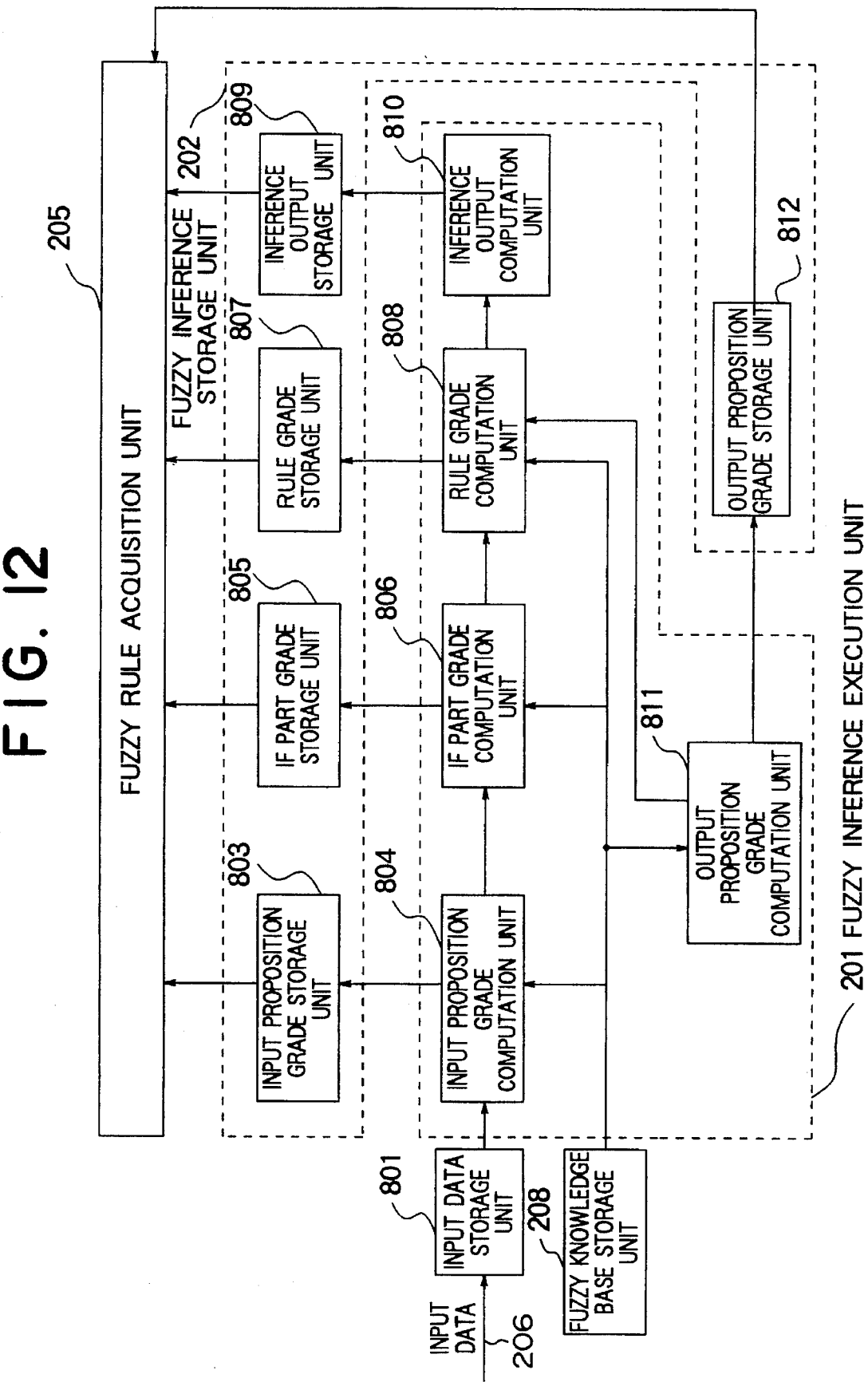
FIG. 12 is a block diagram showing the structure of the fuzzy inference execution unit of the first embodiment.

The structure of the fuzzy inference execution unit and fuzzy inference storage unit of the embodiment is shown in FIG. 12. The rule acquisition apparatus of the embodiment includes the fuzzy knowledge base storage unit 208 for storing fuzzy rules and the like necessary for fuzzy inference, the fuzzy inference execution unit 201 for executing fuzzy inference, the fuzzy inference storage unit 202 for storing intermediate data during fuzzy inference, an input data storage unit 801 for storing the fuzzy inference data 206 supplied to the rule acquisition apparatus, and other necessary units.

Figure 13:
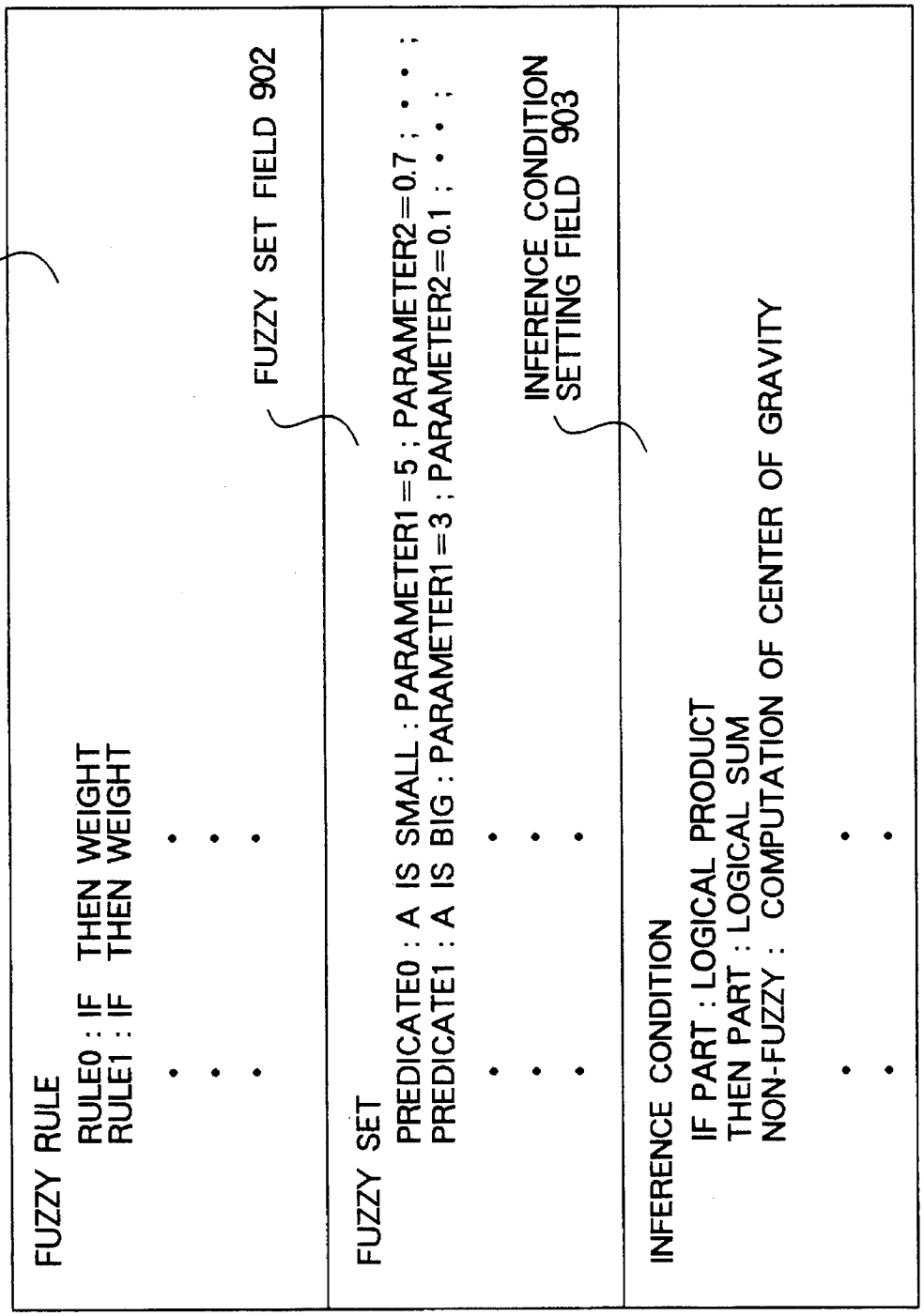
FIG. 13 shows an example of the knowledge base according to the present invention.

The knowledge base (fuzzy knowledge) such as fuzzy rules and the like stored in the knowledge base storage unit 208 shown in FIG. 12 has the contents such as shown in FIG. 13. A fuzzy rule field 901 stores an IF part, a THEN part, a weight representing the degree of importance, and the like, respectively of each rule. A fuzzy set field 902 stores IF part propositions (condition part propositions, input propositions), a THEN part propositions (conclusion part propositions, output propositions), and membership functions. Each membership function is stored in the form of shape parameters defining the shape of the function. As the parameter is changed, the shape of the membership function is changed correspondingly. An inference condition setting unit 903 stores operation definitions of computations of each grade such as the IF part grade and the THEN part grade.

The fuzzy inference execution unit 201 executes fuzzy inference by referring to the inference input data 206 and fuzzy rules, membership functions, and fuzzy inference definitions stored in the fuzzy knowledge base storage unit 208. Specifically, when the inference input data is supplied, an input proposition grade computation unit 804 computes the grade of each input proposition for a membership function while referring to the knowledge base. Next, an IF part grade computation unit 806 computes the IF part grade of each rule from the grade of each input proposition.

An output proposition grade computation unit 811 computes the value of the membership function corresponding to the output proposition. A rule grade computation unit 808 computes the rule grade of each rule from the IF part grade computed by the computation unit 806. Next, an inference output computation unit 810 computes a total grade through a MAX operation between rule grades at each section of the output variable. The center of gravity of the total grade is then computed to obtain a final inference output.

The fuzzy inference storage unit 202 stores intermediate and final results of the fuzzy inference operations at the fuzzy inference execution unit. Specifically, an input proposition grade storage unit 803 stores the grade of each input proposition computed by the input proposition computation unit 804. An IF part grade storage unit 805 stores the IF part grade of each rule computed by the IF part grade computation unit 806. An output proposition grade storage unit 812 stores the grade of each output proposition computed by the output proposition grade computation unit 811. A rule grade storage unit 807 stores the grade of each rule computed by the rule grade computation unit 808. An inference output storage unit 809 stores the total grade and inference output computed by the inference output computation unit 810.

In this embodiment, rules are acquired while referring to the errors of respective rules and propositions obtained each time when fuzzy inference is executed. An error of a rule or proposition implies how much the grade of the rule or proposition influences the error, if present, between a teaching value and an inference output.

In this embodiment, the FLIP-net and extended back propagation method (hereinafter called extended BP method) used by the membership function automatic tuning method of the third conventional technique are applied to the computation of errors of respective rules and propositions. In the embodiments of the present invention, the extended BP method is used for the computation of errors of each rule and proposition in fuzzy inference.

Similar to the third conventional technique, in order to compute errors of each rule and proposition, inference errors are first computed after the fuzzy inference by comparing by each inference output and a teaching value which is a desired inference output. Although a difference between an inference output and a teaching value is used as the inference error, other evaluation functions may be used. For example, a square of a difference between an inference output and a teaching value, with a difference sign added thereto, may by used as the inference error. By using such inference errors and back-propagating the computation network from the right to the left, it is possible to compute errors of each rule and proposition.

Figure 14:
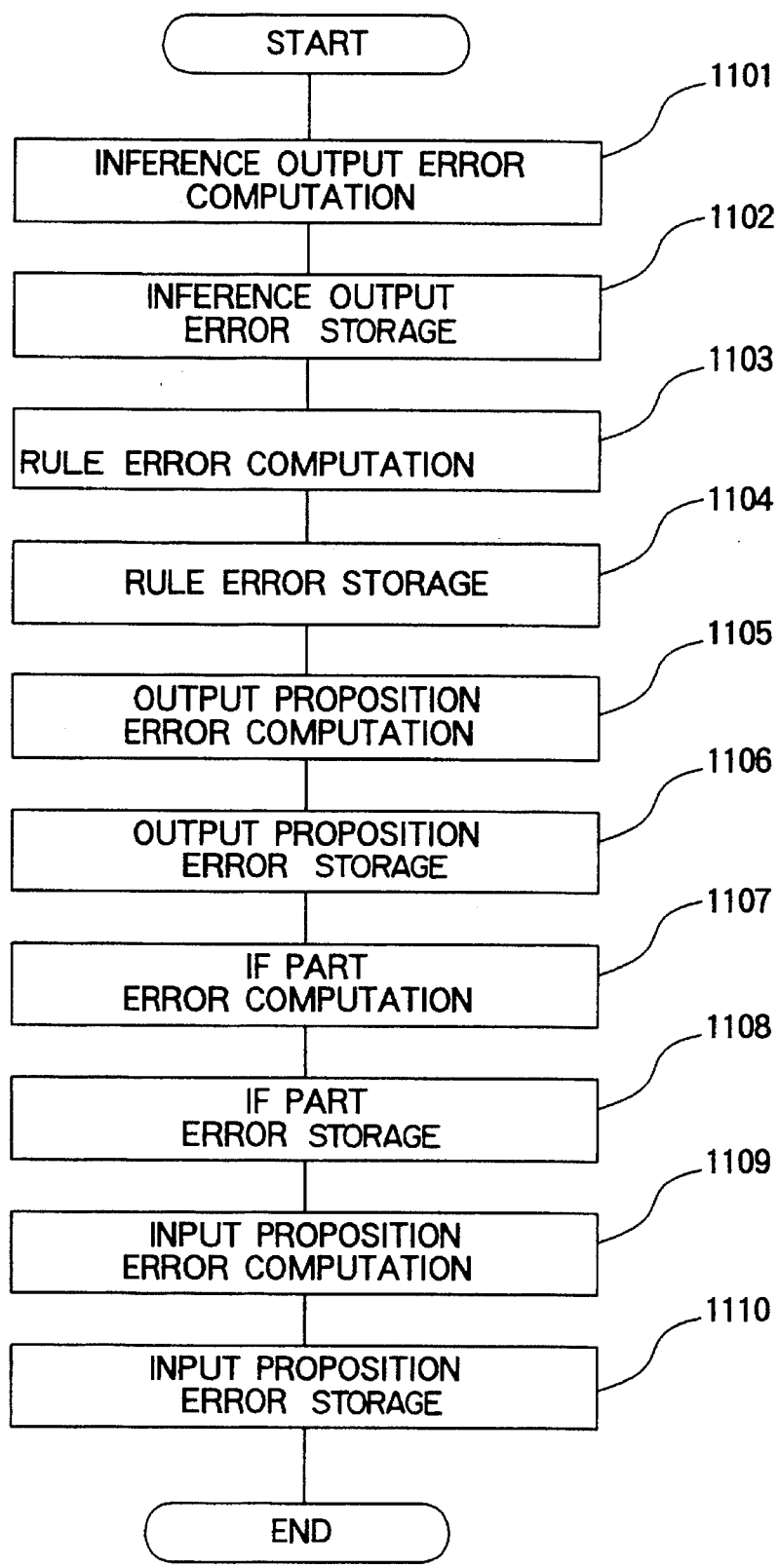
FIG. 14 is a flow chart explaining the operation of the fuzzy inference error computation (inference evaluation) unit of the first embodiment.

In computing errors of each rule and proposition by using inference errors and the extended BP method, errors of each rule and proposition are obtained as partial differential coefficients of the inference output relative to the grade of each rule and proposition multiplied by the inference errors. The computation of errors is performed at the computation network by using the method with delivery of composite function described in "Application of Automatic Partial Derivative Calculation and Rounding Error Estimation to Large Scale Nonlinear Equation", Information Processing, Vol. 26, No. 11, pp. 1411–1420, 1985. A total error is a product of partial differential coefficients of respective computation nodes along the inference path. Namely, errors of each rule and proposition can be obtained by back-propagating the inference error along the inference path and multiplying the output error at each grade computation node by the partial differential coefficient of the function at the node. A flow chart explaining the operation to be executed by the fuzzy inference error computation unit is shown in FIG. 14. Errors of each rule and proposition can be computed by sequentially executing the steps of this flow chart.

Figure 15:
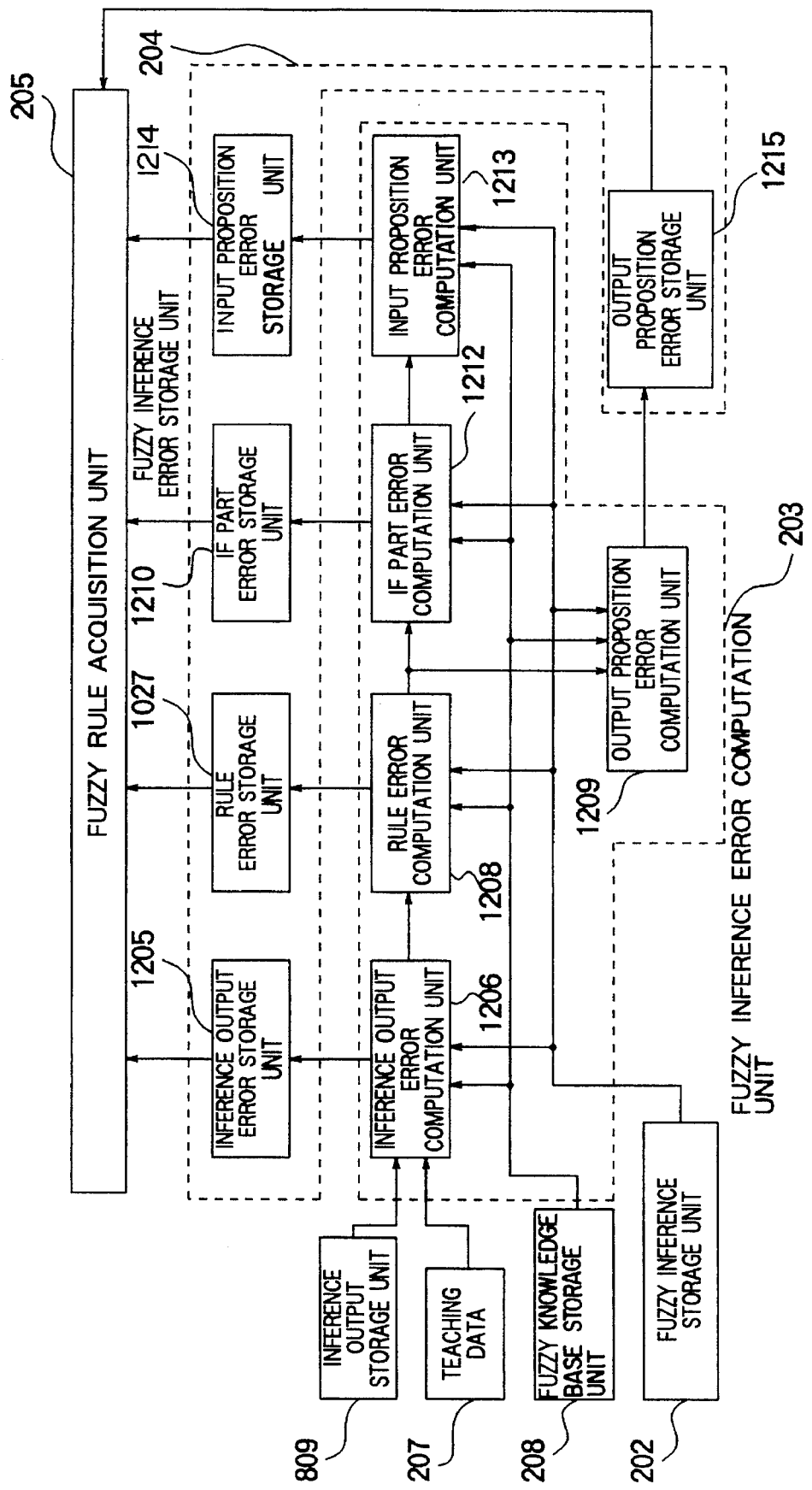
FIG. 15 is a block diagram showing the structure of the fuzzy inference error computation unit and fuzzy inference error storage unit of the first embodiment.

FIG. 15 shows the structure of the fuzzy inference error computation (inference evaluation) unit 203 and fuzzy inference error storage unit 204. The fuzzy inference error computation unit 203 computes errors of each rule and proposition by referring to the teaching data 207, knowledge base of the fuzzy knowledge base storage unit 208, and the contents of the fuzzy inference output storage unit 809 of the fuzzy inference execution unit and the fuzzy inference storage unit 202.

An inference output error computation unit 1206 computes an inference error from the teaching data 207 and the inference output stored in the inference output storage unit 809, and computes an error of the total grade by referring to the knowledge base stored in the fuzzy knowledge base storage unit 208 and the contents of the fuzzy inference storage unit 202. A rule error computing unit 1208 computes each rule error by referring to the error of the total grade, knowledge base, and the contents of the fuzzy inference storage unit 202. An IF part rule error computation unit 1212 computes the IF part rule error of each rule by referring to the rule error, knowledge base, and the contents of the fuzzy inference storage unit 202. An output proposition error computation unit 1209 computes the output proposition error of each rule by referring to the rule error, knowledge base, and the contents of the fuzzy inference storage unit 202. An input proposition error calculation unit 1213 calculates the error of each input proposition by referring to the IF part rule error, knowledge base, and the contents of the fuzzy inference storage unit 202.

The fuzzy inference error storage unit 204 stores the error of each grade computed by the fuzzy inference error computation unit 203. An inference output error storage unit 1205 stores the inference output error and total grade error computed by the inference output error computation unit 1206. A rule grade error storage unit 1207 stores the rule error computed by the rule error computation unit 1208. An IF part rule error storage unit 1210 stores the IF part rule error computed by the IF part error computation unit 1212. An output proposition error storage unit 1215 stores the output proposition error computed by the output proposition error computation unit 1209. An input proposition error storage unit 1213 stores the input proposition error computed by the input proposition error computation unit 1212.

Figure 16:
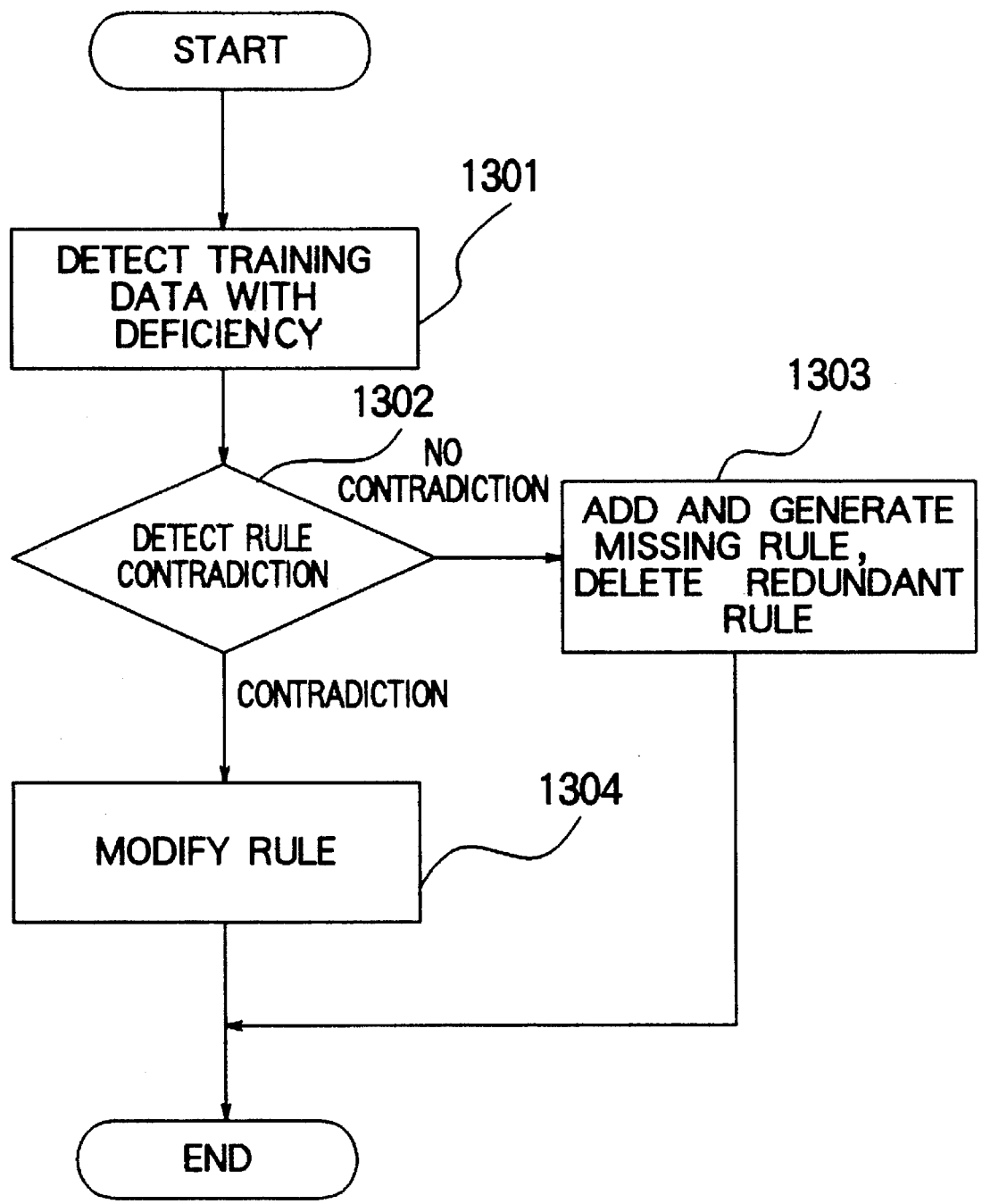
FIG. 16 is a flow chart explaining the operation of the fuzzy rule acquisition unit of the first embodiment.

A flow chart explaining the operation by the fuzzy rule acquisition unit is shown in FIG. 16. Prior to this operation, fuzzy inference has been executed, the intermediate results have been stored in the fuzzy inference storage unit, and errors of each rule and proposition have been computed and stored in the fuzzy inference storage unit.

At the fuzzy rule acquisition unit, first at Step 1301, a set of training data having fuzzy inference deficiency is searched. The training data set with deficiency may include the data set having the inference error of "0". At Step 1302, the inference error of the training data set with deficiency detected at Step 1301 is checked to judge whether the deficiency has resulted either from contradictory rules or from a redundant/missing rule. If the cause of the deficiency is a missing rule, the missing rule is generated at Step 1303 and added to the knowledge base. If there is a redundant rule not used by the fuzzy inference, the rule is deleted from the knowledge base. If it is judged that the deficiency has resulted from contradictory rules, the rules are modified to dissolve the contradiction.

Figure 17:
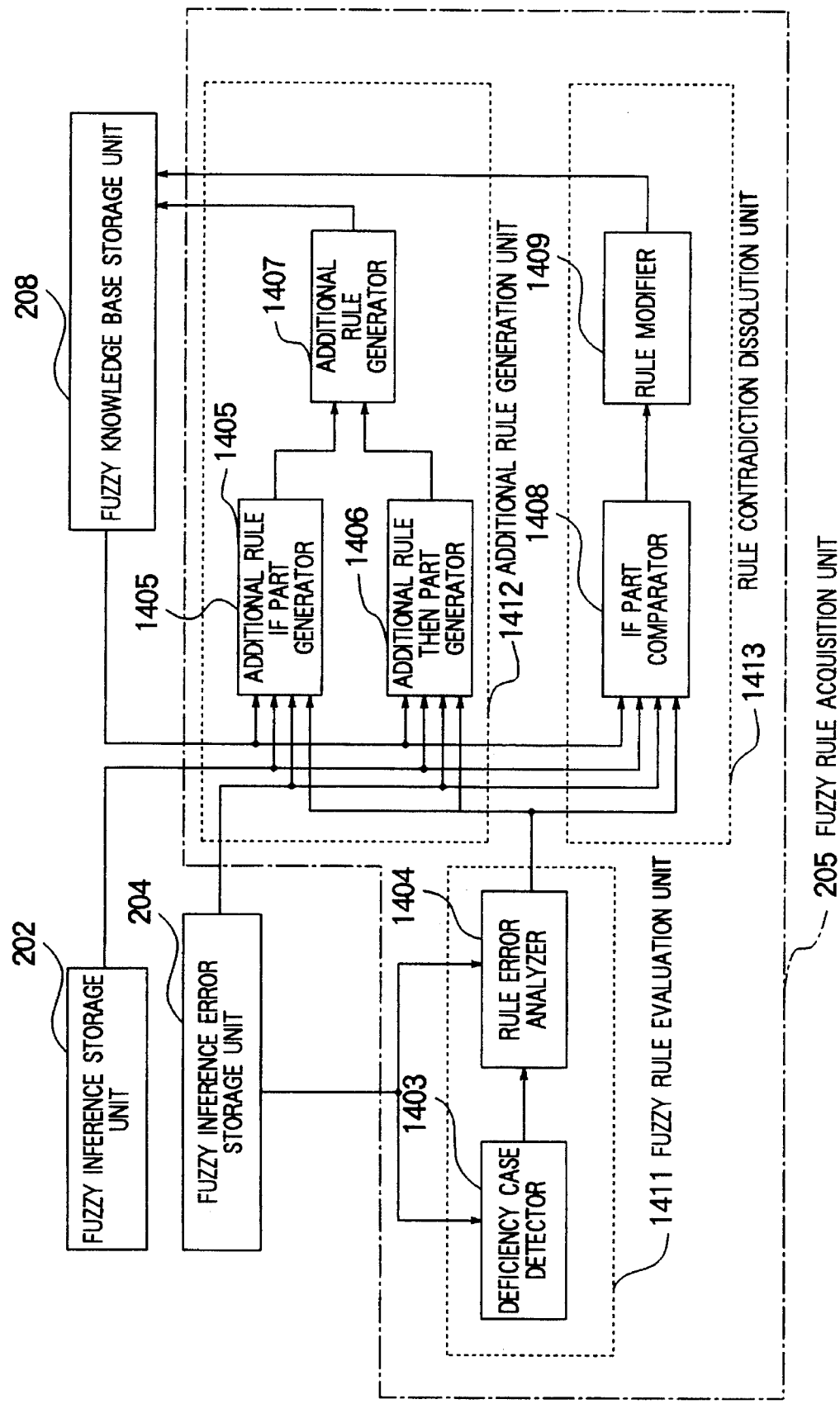
FIG. 17 is a block diagram showing the structure of the fuzzy rule acquisition unit of the first embodiment.

The structure of the fuzzy rule acquisition unit is shown in FIG. 17. At a fuzzy rule evaluation unit 1411, its deficiency case detector 1403 detects a training data set with deficiency by referring to the fuzzy inference error storage unit 204. A rule error analyzer 1404 analyzes the cause of rule deficiency. If the cause of the rule deficiency is a missing rule, at an additional fuzzy rule generation unit 1412, an additional rule IF part generator 1405 generates an additional rule IF part and an additional rule THEN part generator 1406 generates an additional rule THEN part, respectively by referring to the contents of the fuzzy inference storage unit 202, fuzzy inference error storage unit 204, and knowledge base storage unit 208. The additional rule is generated by an additional rule generator 1407 and stored in the fuzzy knowledge base storage unit 208.

If the case of fuzzy inference deficiency is a contradictory rule, at a rule contradiction dissolution unit 1408, an IF part rule comparator 1408 compares the contradictory rule IF parts by referring to the contents of the fuzzy inference storage unit 202, fuzzy inference error storage unit 204, and knowledge base storage unit 208, and by referring to the rule error analyzer 1404. Then, a rule modifier 1409 modifies the contradictory rule to dissolve the contradiction. The contradictory rule in the knowledge base storage unit 208 is replaced by the modified rule.

The procedure of the fuzzy rule acquisition flow chart shown in FIG. 16 will be described more in detail.

After the fuzzy inference errors have been computed, a set of inference inputs and teaching data having deficiency is searched at Step 1301. The simplest method of searching such a data set is to evaluate the inference error of each data set by its square value, and to judge the data set having the maximum value as the data set with deficiency. The clustering method may be used for such evaluation. With the clustering method, respective sets of teaching data are divided into clusters in accordance with errors and grades of each rule and proposition. The error of each cluster is evaluated from a sum of squares of, or an average of, inference errors of training data sets included in the cluster. The cluster having a largest evaluated error is first selected, and then a training data set having a largest inference error in the selected cluster is selected. Another method may be used wherein when inference errors, and errors of each rule and proposition are given, a user selects a training data set with deficiency.

Figure 18:
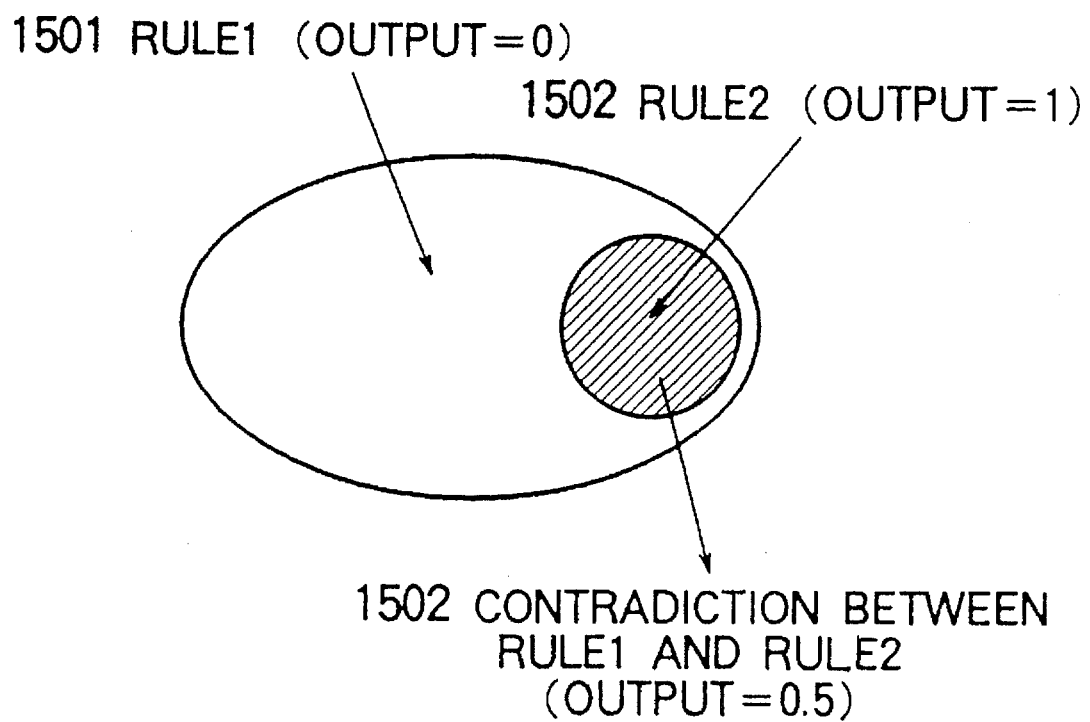
FIG. 18 is a schematic diagram showing a contradiction between fuzzy rules.

At Step 1302, it is checked whether the cause of the deficiency of the training data set has resulted either from rule contradiction or from a redundant/missing rule. Rule contradiction is the state that although a pair of rules has opposite conclusions, both the rules influence the inference output to the same extent. This state is schematically illustrated in FIG. 18 showing the inference input space (IF part) to be inferred. An area 1501 of a rule 1 is superposed upon an area 1502 of a rule 2. This superposed area 1503 is a contradictory area 1503 indicated by hatched lines. Although the output "0" of the THEN part of the rule 1 is opposite to the output "1" of the rule 2, both the rules 1 and 2 are satisfied at the hatched area 1503.

The inference output at the hatched area is the sum of the output propositions of the rules 1 and 2, which is an average of the output "0" of the THEN part of the rule 1 and the output "1" of the THEN part of the rule 2, yielding an output "0.5". Assuming that the teaching data is "0", the inference error of "0.5"−"0"="0.5" is generated by the rule contradiction.

Figure 19:
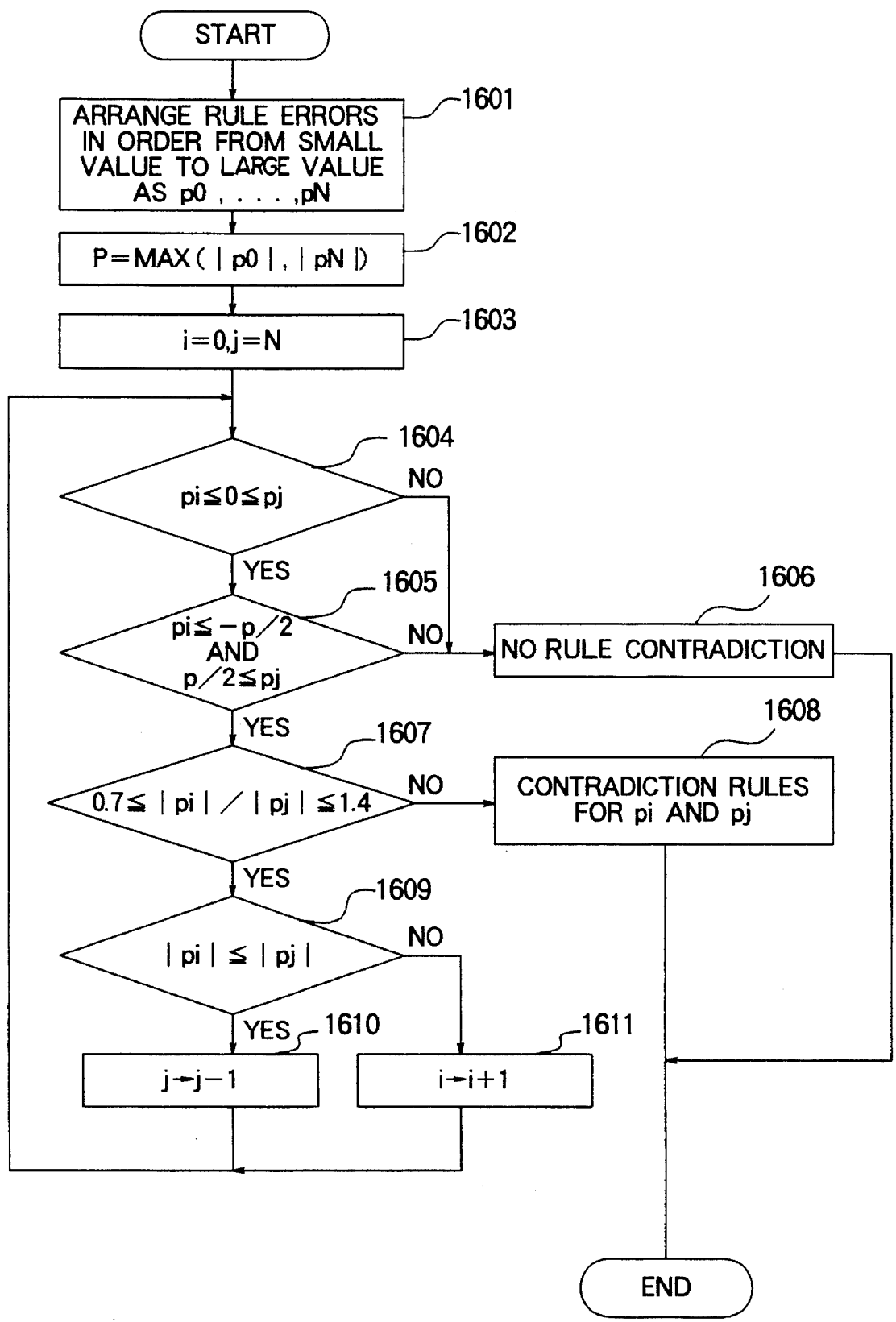
FIG. 19 is a flow chart showing the procedure of searching a contradiction between fuzzy rules by the fuzzy rule acquisition method of the first embodiment.

Rule contradiction can be detected by checking each rule error. If there is a pair of contradictory rules such as shown in FIG. 18, the signs of the rule errors are opposite and the absolute values of the errors are generally of the same order. Therefore, the simplest method of detecting rule contradiction includes a procedure such as illustrated in FIG. 19. First, at Step 1601 rule errors are sorted into negative and positive rule errors and they are arranged in the order from a smaller absolute value to a larger absolute value. At Steps 1602 to 1604 the positive and negative rule errors having the largest absolute value are selected. At Steps 1605 and 1607 it is checked whether the ratio of the two absolute values is near 1, e.g., whether the ratio of the maximum absolute value of the negative rule errors to the maximum absolute value of the positive rule errors is within the range from 0.7 to 1.4. If this condition is satisfied, the two rules are detected as the contradictory rules. If not satisfied, searched is another pair of rules whose absolute values of the errors are generally of the same order, while checking at Step 1605 so as not to make the error absolute values too small.

If the contradictory rules are to be searched more precisely, a method similar to the clustering method used for detecting a training data set having deficiency may be used. After the clustering, rule errors of an optional training data set in the cluster having the largest inference error are correlated to detect a pair of rules whose signs are opposite and whose absolute values are generally of the same order.

If contradictory rules are not detected regardless of the above operations, it is judged that there is an redundant/missing rule.

Figure 20:
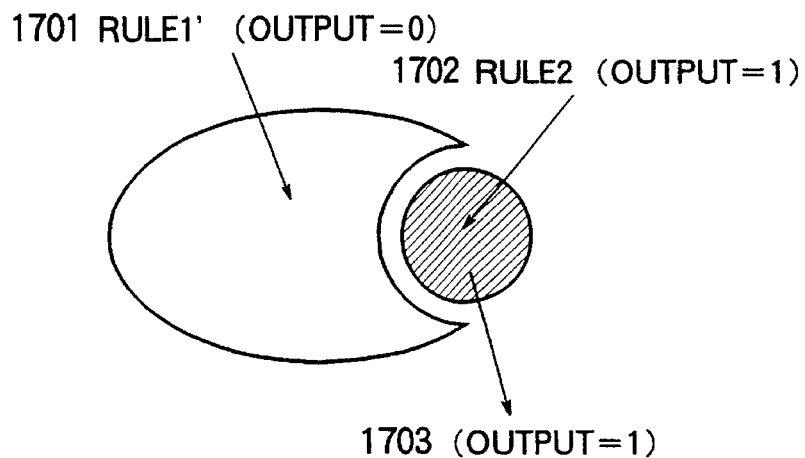
FIG. 20 is a schematic diagram illustrating dissolution of a contradiction between fuzzy rules.

The contradictory rule is modified to dissolve the contradiction. As shown in FIG. 20, the contradiction of rules 1 and 2 can be dissolved by narrowing the area of the rule 1 so that only the rule 2 is satisfied for the input to the contradictory area.

Figure 21:
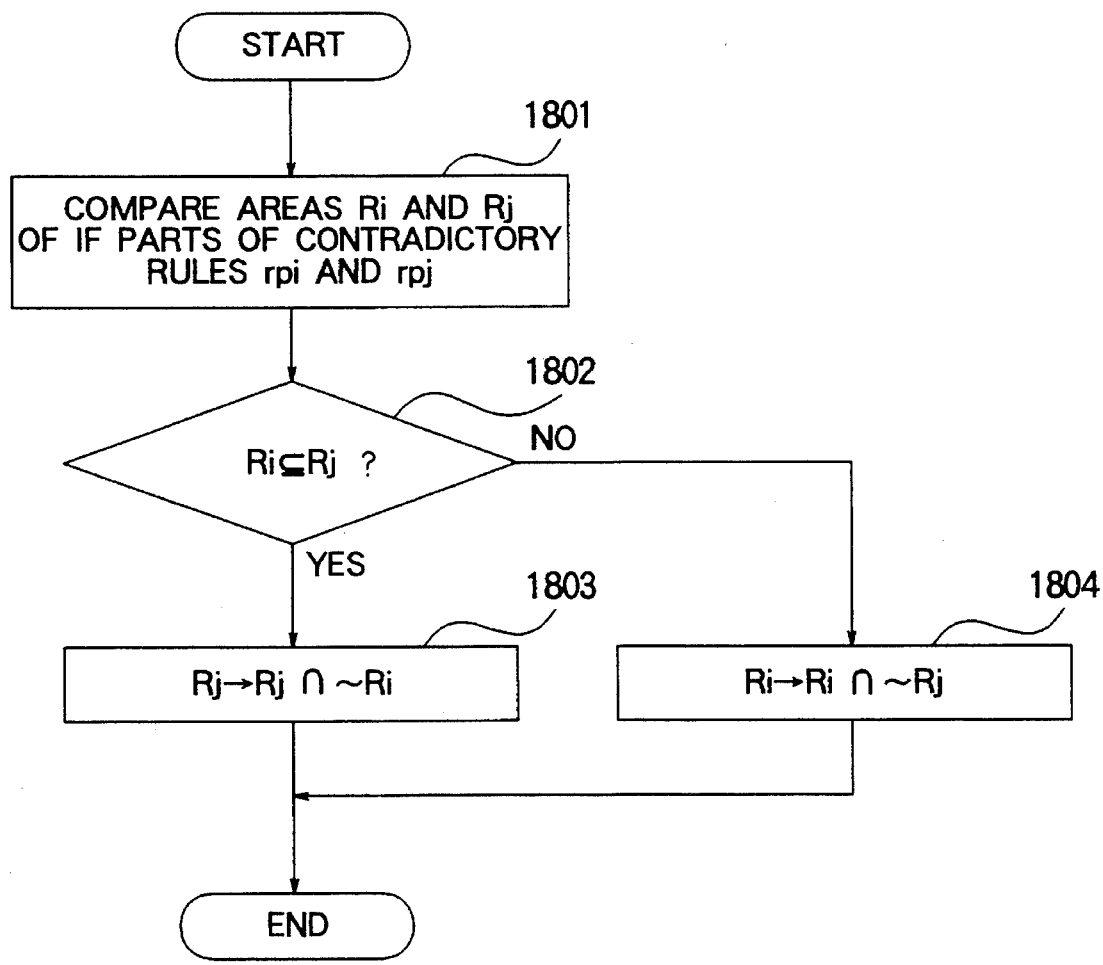
FIG. 21 is a flow chart showing the procedure of dissolving a contradiction between fuzzy rules by the fuzzy rule acquisition method of the first embodiment.

A flow chart explaining the operation of dissolving a rule contradiction is shown in FIG. 21. If there is a pair of contradictory rules, the inclusion relationship between the two IF parts of the rules is checked at Step 1801. At Steps 1802 and 1803 or at Steps 1802 and 1804, the IF part of the rule including the other rule is modified to delete the area corresponding to the IF part of the other rule. Namely, the rule is modified in the following manner.

$$Ra \rightarrow Ra \cap \overline{Rb}$$

where Ra is an area of the IF part of the rule including the other rule, Rb is an area of the IF part of the other rule, and ¯ represents a NOT.

In the above description, for the simplicity purpose, the rule contradiction has been assumed to be generated by two contradictory rules. If it is generated by three or more contradictory rules, detecting and dissolving contradictions can be achieved by repeating this operation together with additional rule generation, as will be later described.

If no contradictory rules are detected, it is judged that there is a redundant/missing rule. A redundant rule is a rule which has not been used for fuzzy inference at all and has no influence to inference errors. A redundant rule is detected while referring to the data stored during the fuzzy inference for each training data set. However, in practice, there is a case where a rule which has not been used for fuzzy inference at all may be used thereafter because of the rule modification and addition operation during the fuzzy rule acquisition process. Therefore, deleting a redundant rule is effected while taking into consideration the rule contradiction dissolution, missing rule addition, and the like.

If rule deficiency is detected and no contradiction is detected, it means that there is a missing rule because the redundant rule does not directly influence fuzzy inference. If no contradiction is detected, a missing rule is generated and added to the knowledge base.

In generating an additional rule, a missing inference area is identified by referring to fuzzy inference errors. In general fuzzy inference, if there is a missing rule adapted for inference input data, interpolation of rules near the missing rule is performed to compute inference output. Therefore, errors caused by the missing rule are distributed to rules near the missing inference area. As a result, the missing inference area can be identified from the area defined by all rules selected as having a high grade and a large error for inference data input.

Figure 22:
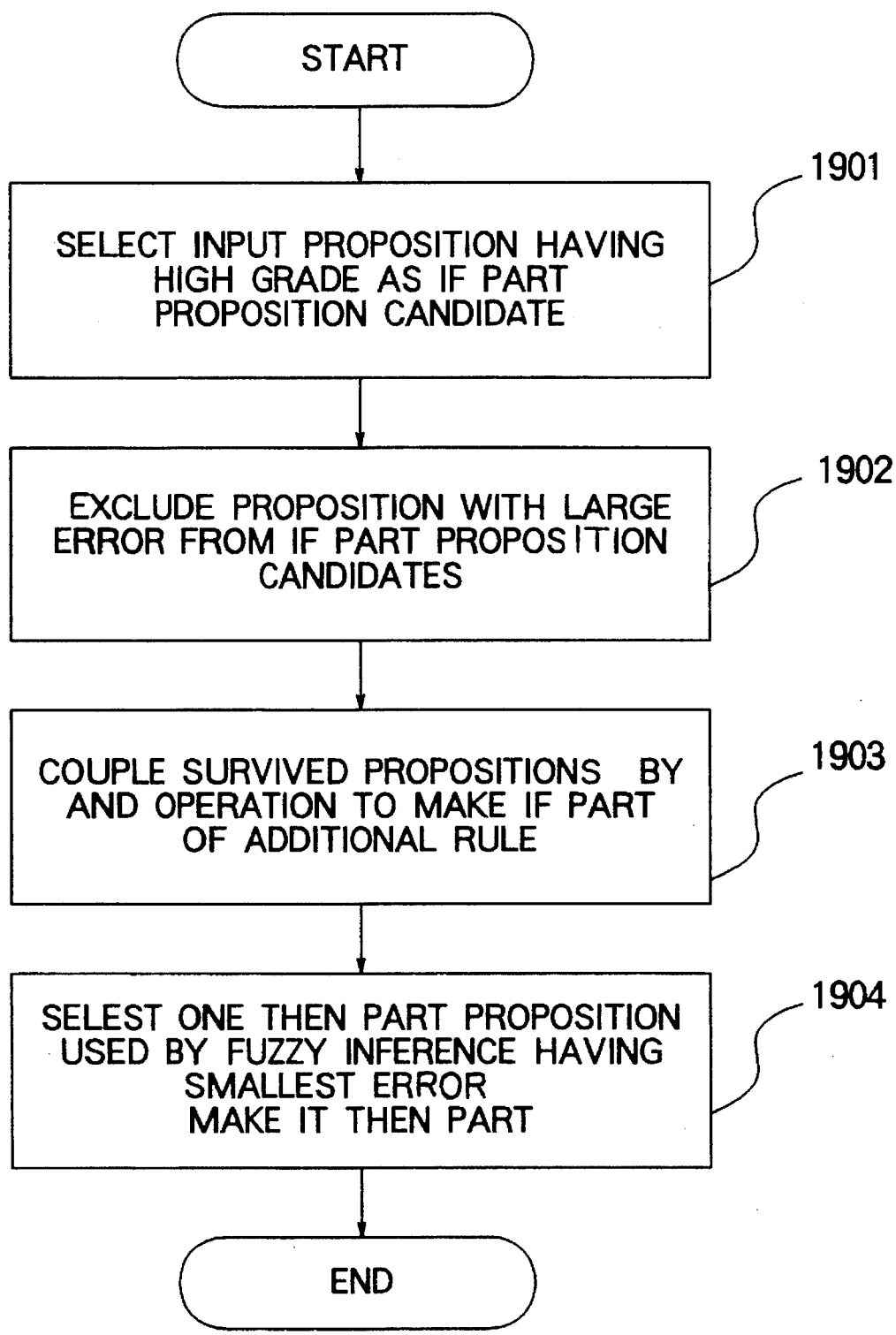
FIG. 22 is a flow chart showing the procedure of generating a missing fuzzy rule by the fuzzy rule acquisition method of the first embodiment.

After the missing inference area is identified, an additional rule is generated by determining the IF part and THEN part divisionally, in accordance with the rules near the missing inference area. FIG. 22 shows a flow chart explaining the operation of generating an additional rule. Prior to executing this procedure, fuzzy inference and evaluation have been executed and the grades of each rule and proposition have been stored in the fuzzy inference storage unit 202.

At Step 1901 shown in FIG. 22, the grade of each input proposition is checked while referring to the contents of the fuzzy inference storage unit 202. Since the input proposition having a high grade can be considered as properly expressing the state of inference input of the training data set, this input proposition can be used as a candidate for generating the IF part of the additional rule. At Step 1902 the error of each input proposition is checked while referring to the contents of the fuzzy inference storage unit. Since the input proposition having a large error can be considered as not properly expressing the state of inference input of the training data set, it is not suitable for a candidate for generating the additional rule. Of input propositions, those having a high grade are selected and those having a large error are excluded. At Step 1903, the selected input propositions are coupled by an AND operation to generate the IF part of the additional rule. The criterion for selecting the input proposition having a high grade and a small error is provided in advance by a user. For example, this criterion may be "excluding five input propositions having the first to fifth largest absolute errors and selecting three input propositions having a grade of 0.5 or higher". The reference grade of 0.5 or higher may be set to other values such as the absolute values of the error and grade.

At Step 1904, the THEN part of the additional rule is determined. Determining the THEN part is to select an output proposition nearest to the teaching value. Different from the IF part, in the case of the THEN part, the grade of the output proposition cannot be used. Therefore, at Step 1904, one output proposition having the smallest error is selected and used as the THEN part.

In the above manner, the IF and THEN parts of the missing rule can be generated which are then added to the knowledge base.

In order to evaluate the grade and error more precisely for the generation of an additional rule, as described with the rule contradiction detection, a method similar to the clustering method may be used wherein an optional cluster containing a training data set having deficiency is checked, and the grade and error are evaluated by the average value or sum of them of the training data sets in the cluster.

Figures 23, 24:
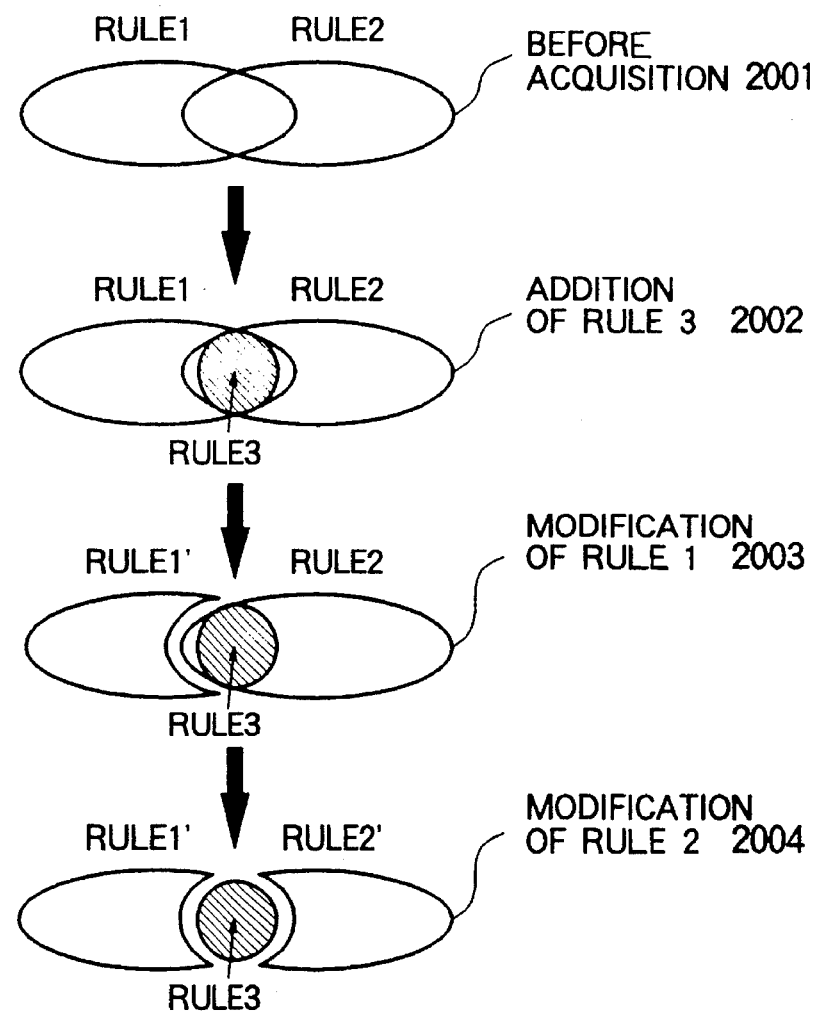
FIG. 23 is a flow chart showing the procedure of acquiring complicated rules by the fuzzy acquisition method of the first embodiment.
FIG. 24 shows the relationship between input and output data for an error computation model used by the first embodiment.

Sequentially repeated in the actual rule acquisition operation are fuzzy inference execution, fuzzy inference error computation, rule contradiction detection, redundant/missing rule detection, rule modification, rule addition, and rule deletion. These operations continue until the rule acquisition operation proceeds to the degree that the inference error becomes sufficiently small. Such repetitive operations allow rules to be acquired even for a complicated case such as shown in FIG. 23 at Step 2001. At Step 2002 a rule 3 for the hatched area is added by the missing rule detection/addition. At Step 2003 the rules 1 and 3 are separated by the contradiction detection and rule modification. At Step 2004 the rules 2 and 3 are separated by the contradiction detection and rule modification, to thus complete the rule acquisition.

In the above embodiment, fuzzy inference with a single inference output has been described. The invention is readily applicable to a plurality of inference outputs by executing the above-described operations relative to each subjective of the THEN part.

In the above embodiment, fuzzy inference is evaluated by errors and a rule is added or modified relative to only an area having a large error. Accordingly, a fuzzy rule can be acquired by a minimum work of rule modification and addition, and more efficiently than conventional methods.

The operation of the embodiment will be described by using a simple model of a three-input and one-output which takes values 0 or 1. The relationship between inputs and outputs of the model is shown in FIG. 24. The input of the model corresponds to a fuzzy inference value, and the output corresponds to the teaching value.

In the following, the process of acquiring rules from incomplete initial rules will be described. The initial rules are shown in FIG. 25. The details of membership functions are omitted. Inputs and outputs for the fuzzy inference used for these rules are shown in FIG. 26. The inference output different from the teaching value is obtained when the fuzzy inference inputs of $X=Y=Z=0$ are given.

For the simplicity of explanation, nine different sets of inputs and outputs are used as the training data sets of the model. The learning data sets are as shown in FIG. 24.

Figure 10:
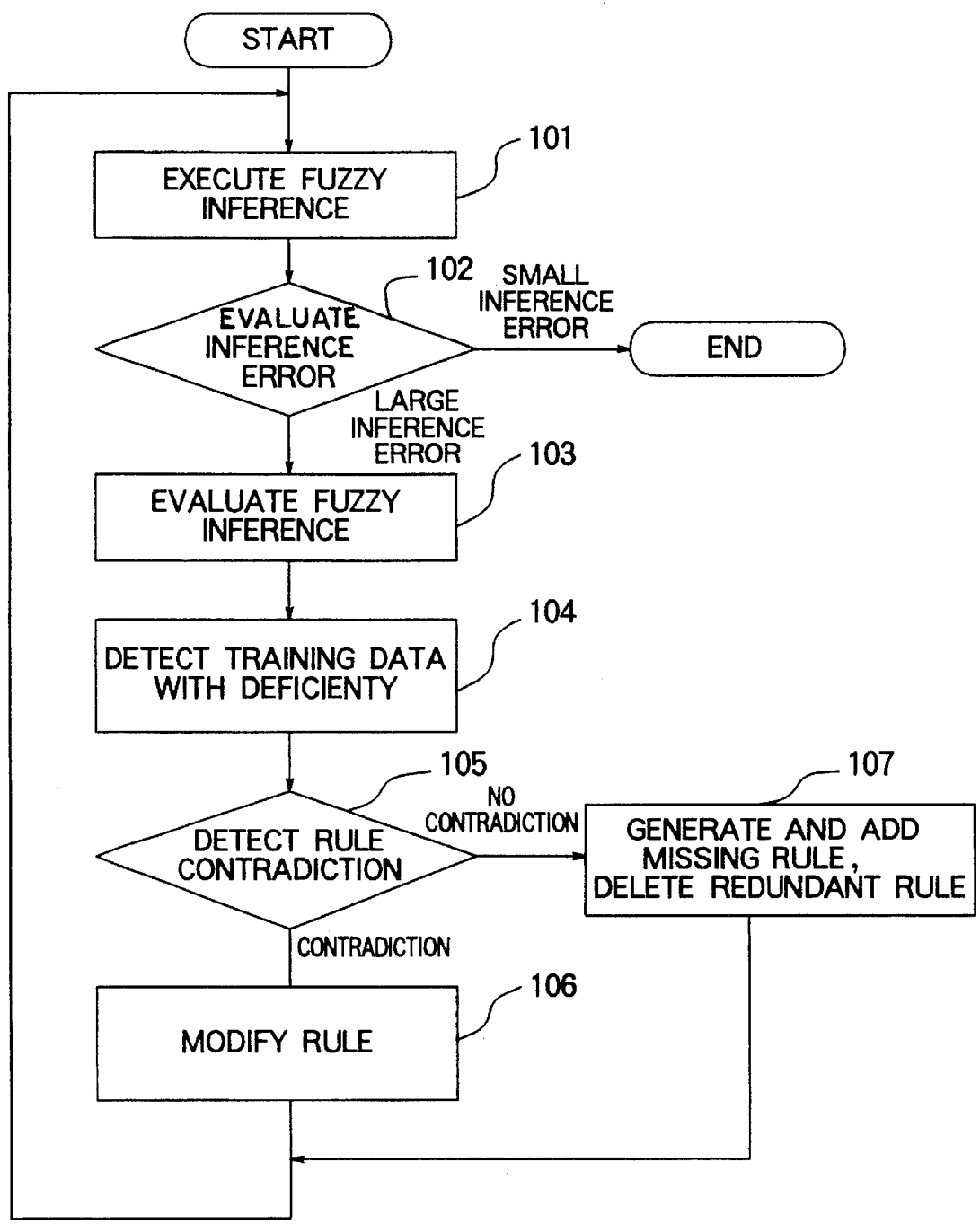
FIG. 10 is a flow chart showing the procedure of a rule acquisition method according to a first embodiment of the present invention.

FIG. 10 is a flow chart illustrating the operation of acquiring rules according to the embodiment of the present invention. In this embodiment, for the preparation of rule acquisition, rules and the shapes of membership functions are added to the knowledge base by using a knowledge base editing unit, and training data sets are also prepared.

At Step 101 fuzzy inference is performed for each training data set. During the fuzzy inference, the grades and the like of respective propositions and rules are stored in the fuzzy inference storage unit.

When the inference output has been computed, it is compared with the teaching value at Step 102. If the error is sufficiently small, the fuzzy inference is terminated. If not, the fuzzy inference is evaluated at Step 103. The inference error is evaluated by a square of a difference between the inference output and the teaching value. In accordance with the inference error, the errors of respective propositions and grades are computed. The computed errors are stored in the fuzzy inference error storage unit 204.

After the completion of the fuzzy inference evaluation, a training data set with deficiency is selected at Step 104 by referring to the computed inference errors. The inference errors of training data sets are illustratively shown in FIG. 27. The training data set having the largest inference error is the first set shown in FIG. 27. Rule acquisition is executed by using this data set. The training data set with deficiency may include the data set having the inference error of "0".

At Step 105 shown in FIG. 10, rule contradiction is judged from the rule errors of the selected training data set. The rule errors of the selected training data set are illustratively shown in FIG. 28. If the criterion of judging a contradiction is |positive error of rule|/|negative error of rule|≦0.7, then there is no rule contradiction in this example because there is no rule having a positive error. Accordingly, it is judged that there is a missing rule so that the flow advances to Step 107 to generate the missing rule.

At Step 107, first the IF part of the missing rule is generated. FIG. 29 shows the grade and error of each input proposition. Generating the IF part is an AND operation of input propositions selected as having a small error and a high grade. In this embodiment, the following rules of generating the IF part are given.

a) Exclude an input proposition having an error, and b) Select all propositions having a grade of 0.5 or higher, and couple them through an AND operation.

With the above rules, the IF part of the additional rule becomes (X=0 AND Y=0 AND Z=0).

The errors of each output proposition are illustratively shown in FIG. 30. One of the output propositions having the smallest error is selected as the THEN part. In this example, the THEN part is (Output=1).

In the above manner, the additional rule becomes "IF (X=0 AND Y=0 AND Z=0) THEN (Output=1)". This rule is added to the knowledge base as a rule 5.

After the completion of adding the new rule, the flow returns to Step 101 to again execute the fuzzy inference. Errors of the second fuzzy inference are shown in FIG. 31. As shown in FIG. 31, the inference errors are still large, and so the second rule acquisition is executed. At Step 104, a training data set with deficiency is detected. As shown in FIG. 31, the first training data set has the largest error. The rule errors of the selected training data set are shown in FIG. 32. At Step 105 shown in FIG. 10, it is judged that the rules 3 and 5 are contradictory. At Step 106 the contradiction of the rules 3 and 5 is dissolved.

At Step 106 the areas of the IF parts of the rules 3 and 5 are compared with each other. Since the area of the IF part of the rule 5 is included in the area of the IF part of the rule 3 (inclusion relationship), the IF part of the rule 3 in the knowledge base is modified as follows.

The IF part of the rule 3 is "X=0 AND NOT (X=0 AND Y=0 AND Z=0)". This is equivalent to "(Z=0 AND Y=1) OR (X=0 AND Z=1)". Therefore, the rule 3 is modified as "IF [X=0 AND Y=1) OR (X=0 AND Z=1)] THEN (Output=0)"

After the modification of the rule 3, the flow returns to Step 101. The rule acquisition continues and the following rules are modified. The modified rules are represented by adding an apostrophe (').

3rd Rule Acquisition

Contradiction dissolution: The rules 2 and 5 are contradictory, and the rule 2 is modified.

Rule 2': IF (X=1 AND Y=0) OR (Z=1 AND Y=0) THEN (Output=0)

4th Rule Acquisition

Contradiction dissolution: The rules 1 and 5 are contradictory, and the rule 1 is modified.

Rule 1': IF (Y=1 AND X=0) OR (Z=1 AND X=0) THEN (Output=0)

In the above manner, the following rules are acquired eventually.

Rule 1': IF (Y=1 AND X=0) OR (Z=1 AND X= 0) THEN (Output=0)

Rule 2': IF (X=1 AND Y=0) OR (Z=1 AND Y= 0) THEN (Output=0)

Rule 3': IF (X=1 AND Z=0) OR (Y=1 AND Z= 0) THEN (Output=0)

Rule 4: IF (X=1 AND Y=1 AND Z=1) THEN (Output=1)

Rule 5: IF (X=0 AND Y=0 AND Z=0) THEN (Output=1)

The rules acquired are complete as seen from the inference errors shown in FIG. 33.

In generating the IF part, propositions having a small error or having a high grade may be selected and coupled.

In the above embodiment, fuzzy inference is performed first for one training data set to compute fuzzy inference errors, and then another training data set to the last data set among all training data sets. If there are a number of training data sets, fuzzy inference may be performed first for all the training data sets to compute only the errors of inference outputs, and then fuzzy inference errors for only the data sets having a large inference output error may be computed.

In the above and following embodiments, only the contradictory rule modification and missing rule addition may be performed without executing the redundant rule deletion.

Figure 34:
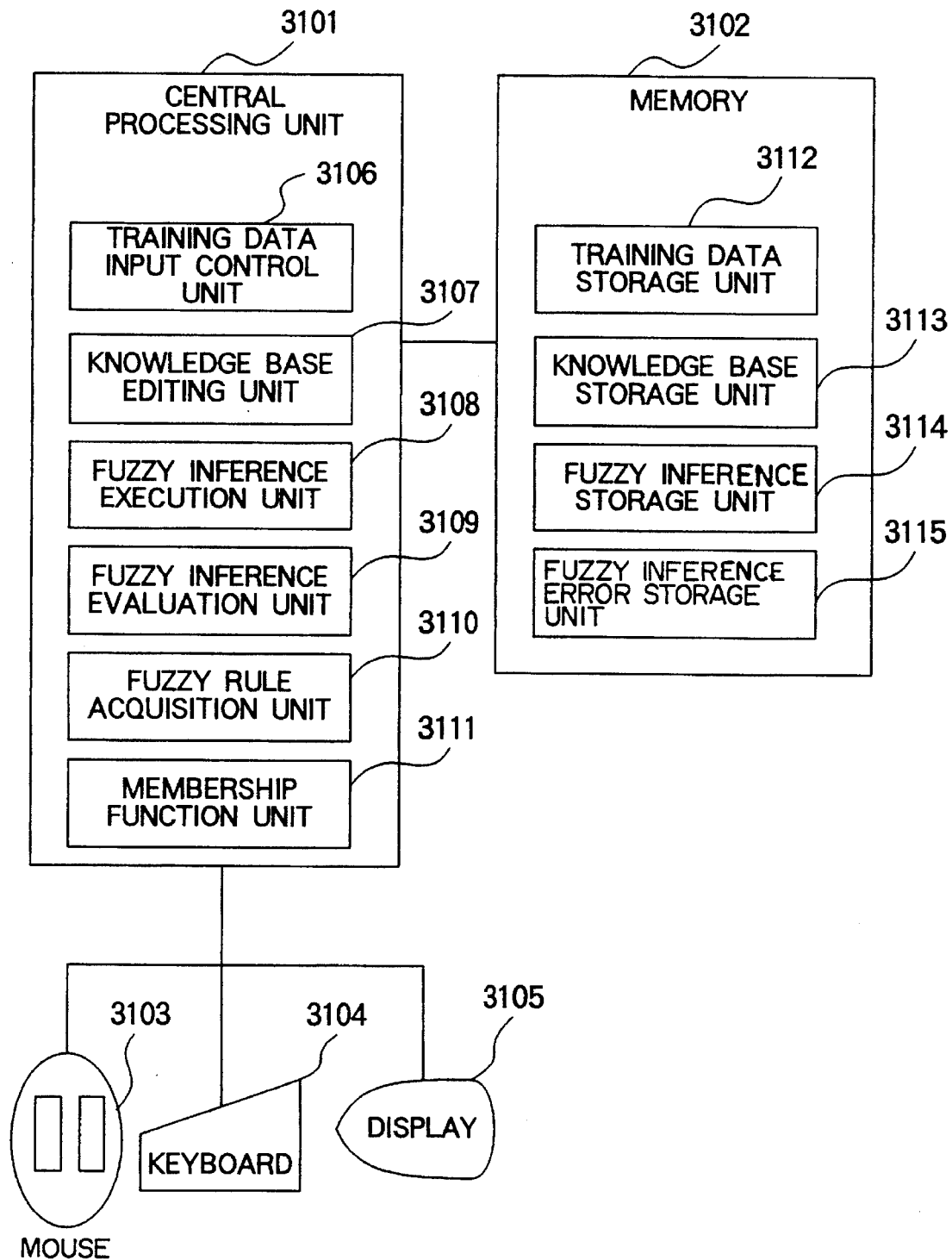
FIG. 34 is a block diagram showing an example of the hardware structure of the first embodiment.

The first embodiment may be realized as a hardware system. In such a case, the fuzzy control processor 200 is formed by hardware, i.e., the fuzzy inference execution unit 201, fuzzy rule acquisition unit 205, and fuzzy inference error computation unit 203 are formed by hardware. A hardware system such as shown in FIG. 34 may also be used. Namely, this computer system is constructed of a central processing unit 3101, a storage unit 3102, a mouse 3103, a keyboard 3104, a display unit 3105, and the like. The storage unit 3102 stores the system program for the central processing unit 3101, and has storage areas corresponding to the fuzzy inference storage unit, fuzzy inference error storage unit, training data storage unit, and knowledge base storage unit.

The central processing unit 3101 executes the system program to realize a rule acquisition apparatus. The input unit such as the mouse 3103 and keyboard 3104 serves as an input control unit for the central processing unit 3101, and realizes the functions of a training data input control unit 3106, a knowledge base editing unit 3107, and an acquired rule modifying unit for changing the contents of an acquired rule to be described in the second embodiment. Training data, knowledge base, and the like may be entered from an external storage unit (not shown) or from another apparatus via a bus line (not shown). The display unit 3105 realizes the functions of the knowledge base editing unit and acquired rule modifying unit in cooperation with the central processing unit 3101, and realizes the function of displaying the rule acquisition operation routine and the function of interacting with a user.

The fuzzy rule acquisition method according to the second embodiment of the present invention will be described. The structure of the fuzzy inference apparatus is the same as the first embodiment. In this embodiment, the rule acquisition operation progresses in the manner easy to be understood by a user. The contents of a series of rule acquisition operations are presented to a user so as to use the experience and knowledge of the user sufficiently, and if necessary the operations are performed interactively with the user. The series of rule acquisition operations include rule contradiction detection, redundant/missing rule detection, rule modification for the dissolution of contradiction, missing rule generation, and redundant rule deletion. The sequence of these operations is illustrated in a flow chart shown in FIG. 35.

Figure 35:
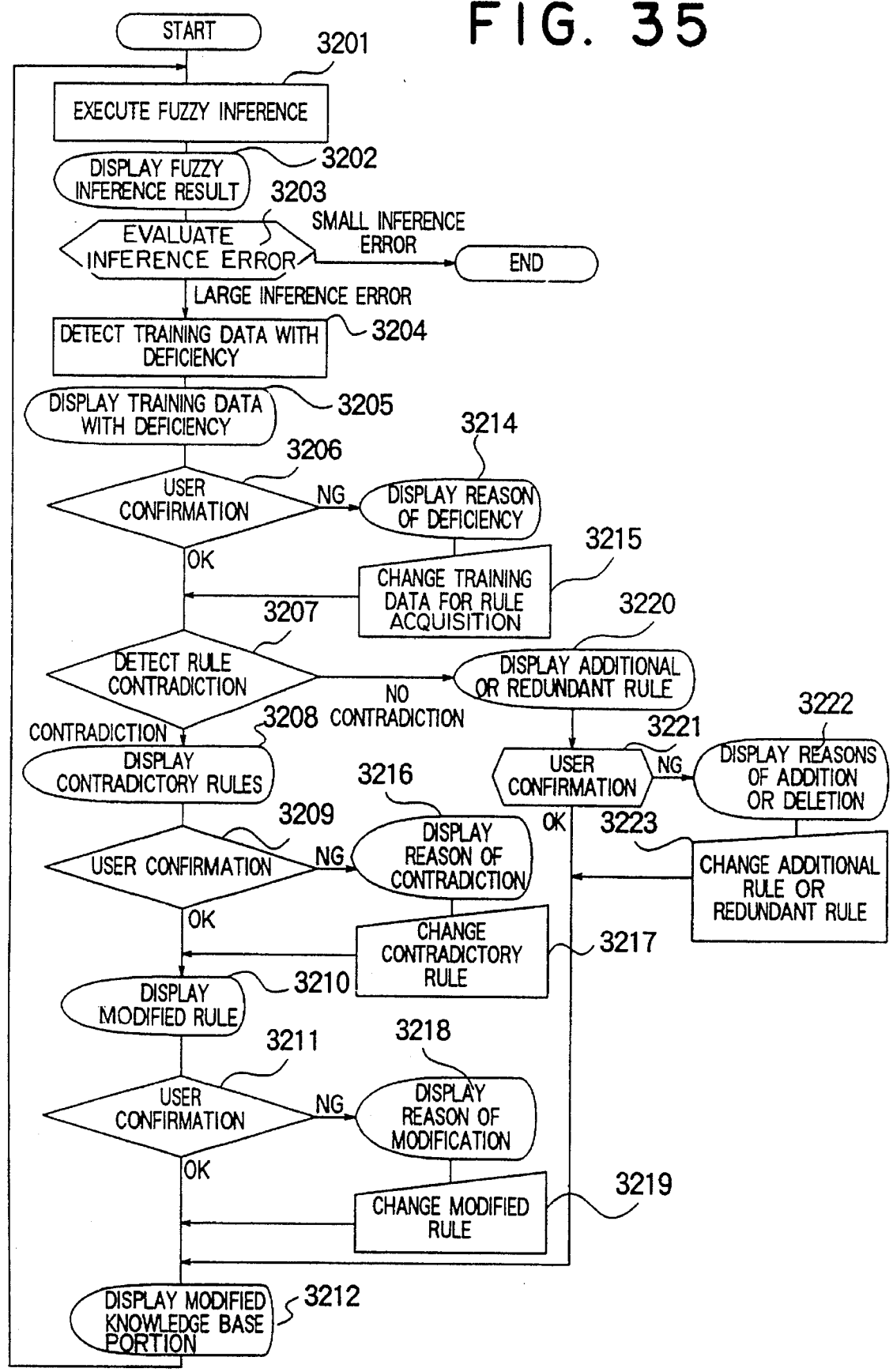
FIG. 35 is a flow chart showing the procedure of acquiring a fuzzy rule according to a second embodiment of the present invention.
Figures 36, 37:
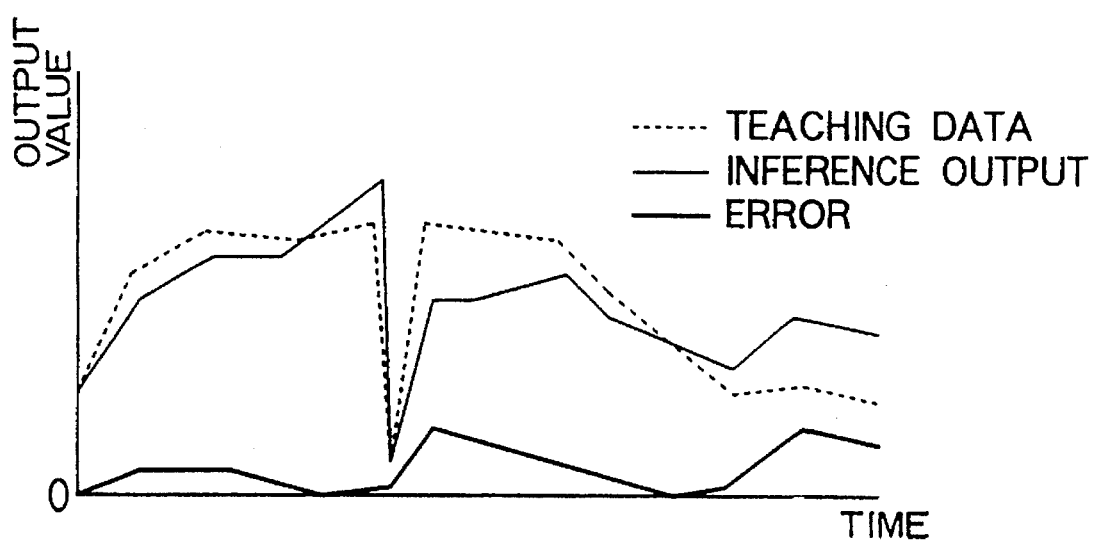
FIG. 36 shows an example of a display of fuzzy inference results according to the second embodiment.
FIG. 37 shows another example of a display of fuzzy inference results according to the second embodiment.

At Step 3201 shown in FIG. 35, fuzzy inference is performed for training data sets. At Step 3202, the inference outputs, teaching values, and inference errors are graphically displayed on a display unit, for example, in a table format such as shown in FIG. 36. This table may be displayed depending upon the characteristics of data and a user request. If the object of fuzzy inference is time series data, the inference output, teaching value, and inference error may be displayed in a graph format such as shown in FIG. 37 on the display screen of the output terminal equipment 212.

Figures 38, 39:
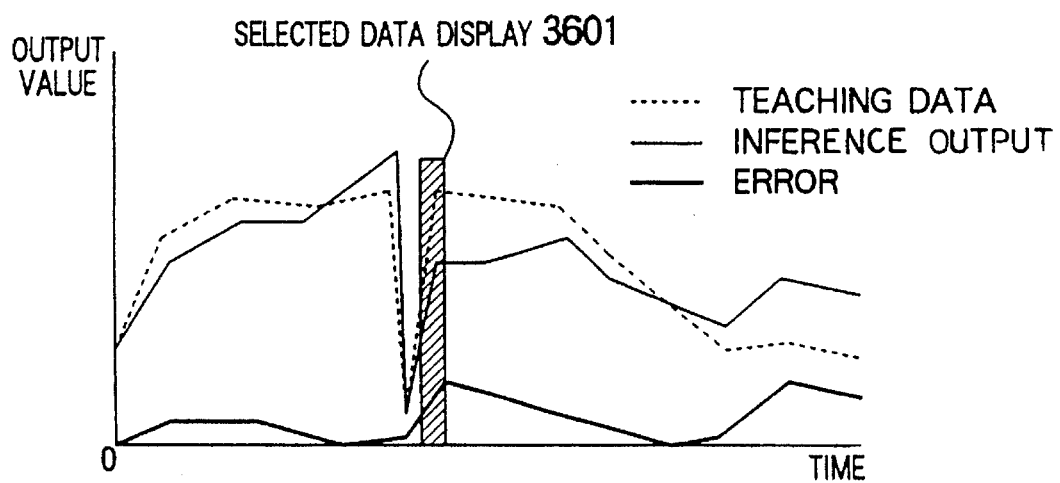
FIG. 38 shows examples of a display of selection results of training data with deficiency and a display of inference input data according to the second embodiment.
FIG. 39 shows an example of a display of selection results of training data with deficiency according to the second embodiment.

After the fuzzy inference, at Step 3204 a training data set with deficiency is selected by the method described with the first embodiment. At Step 3205 the selected training data set is presented to a user by highlighting them on the display screen like shown in FIG. 39. If the fuzzy inference result is shown in a graph format like in FIG. 37, the selected training data set is displayed by coloring them like shown in FIG. 38 or by other methods. At Step 3214 a user may instruct to display the input data set for an optional inference result on the same display screen like shown in FIG. 38 or on another display screen, by pointing the inference result on the display screen by a mouse or the like. This input data set may be displayed in a graph format depending upon the characteristic of the input data. If the user is not satisfied with the selected training data set with deficiency, another data set may be selected at Step 3215 by pointing it on the display screen by a mouse or the like, like shown in FIGS. 38 and 39.

After the training data set with deficiency is finally selected, at Step 3207 it is checked whether the cause of deficiency has resulted from rule contradiction or from a redundant/missing rule. If the cause of deficiency is the rule contradiction, the contradictory rules in the knowledge base are presented for the confirmation by the user by displaying them in the manner shown in FIG. 40. The rule modified to dissolve the contradiction is displayed on the same display screen which is displaying the rule before the modification in the display format like shown in FIG. 40, or on another display screen. If the rule modification contradicts with a user request, the rule modification may be changed by using a keyboard or mouse. A user may instruct, if necessary, to display the data by which the rule contradiction has been determined and the data by which the rule modification has been determined, on the same display screen or another display screen in the manner shown in FIG. 40.

If it is judged at Step 3207 that the cause of deficiency is a missing rule, the generated additional rule is presented for the confirmation by the user by displaying it on the same display screen displaying the associated nearby rules like shown in FIG. 41, or on another display screen. If the contents of the additional rule contradicts with a user request, the additional rule may be modified by using a keyboard or mouse. A user may instruct to display the data by which the additional rule generation has been determined, on the same display screen which is displaying the associated nearby rules, or on another display screen, either in a table format or graph format. Such data includes the grades, errors, and the like of each rule and proposition.

If a redundant rule is detected, the rule to be deleted is displayed for the confirmation by the user in the similar manner as above on the display screen to present it to the user. If the user does not permit the deletion of the rule, the rule deletion may be intercepted by using a mouse or the like.

Figures 42, 43:
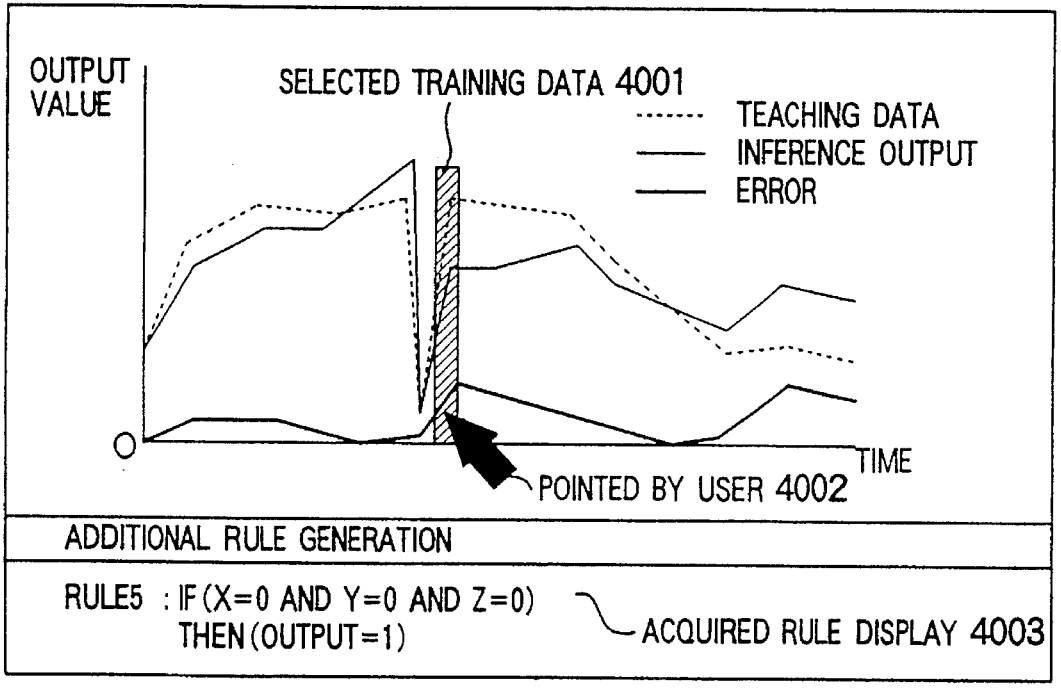
FIG. 42 shows examples of a display of the contents of the modified knowledge base and a display of the contents of the knowledge base before modification, according to the second embodiment.
FIG. 43 shows an example of a display illustrating how a user directly selects training data for the rule acquisition, according to the second embodiment.

After the establishment of the rule addition and modification relative to the knowledge base, the IF parts having the same conclusion part are coupled by an OR operation to make it a single IF part. The added and modified rules are displayed on the display screen by highlighting them as shown in FIG. 42. These processes provides a user with the rules in a simplified and easy-to-understand form.

In the above embodiment, all the processes of the fuzzy acquisition operation have been displayed on the screen for the confirmation by a user. Some of such display and confirmation may be omitted. For example, as shown in FIG. 43, after the fuzzy inference results have been displayed, a user may point the area with deficiency by a mouse or the like to display the modification of the knowledge base by which the error at the area can be reduced.

The fuzzy rule acquisition operation can be performed as described above by the addition and modification of an IF-THEN rule given by linguistic knowledge representation. Even a user having no knowledge of fuzzy inference can understand the acquired rule, facilitating the inspection, test, and maintenance. In the case of rule addition and modification, the contents of the addition and modification together with the data by which the addition and modification have been determined are displayed on the screen. Accordingly, even a user having no knowledge of fuzzy inference can check the pertinence of the rule to be added, modified, or deleted, and can easily prevent acquisition of an incorrect rule. A user can interactively modify, if necessary, an IF-THEN rule at each process of the rule acquisition operation. Accordingly, experience, knowledge, request, and the like of a user can be reflected on each rule, making it easy to obtain a knowledge base sufficient for the user.

Figure 44:
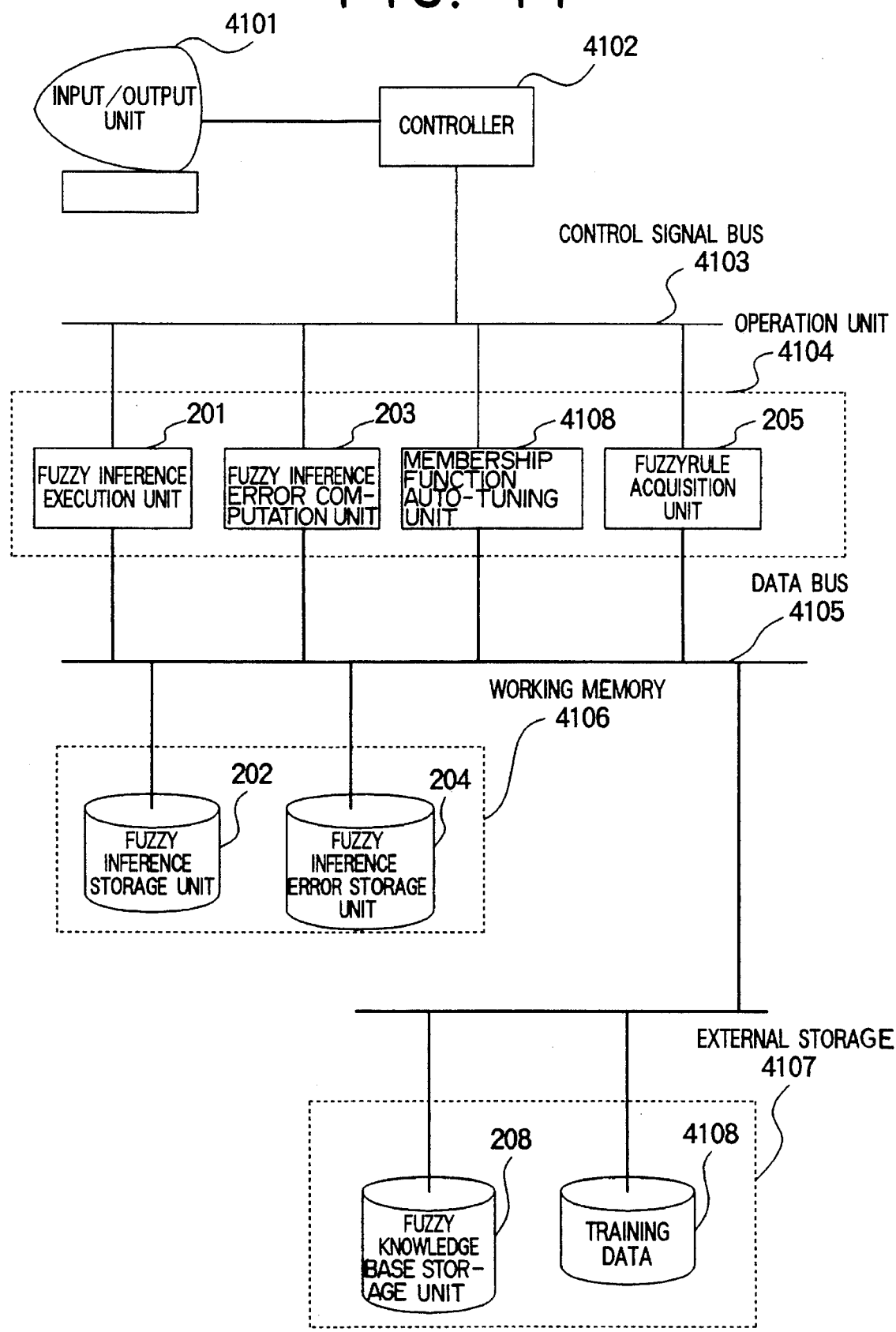
FIG. 44 shows the structure of a fuzzy rule acquisition apparatus according to a third embodiment of the present invention.

The fuzzy rule acquisition method according to the third embodiment of the present invention will be described. FIG. 44 shows the fuzzy inference system of the embodiment. The fuzzy inference system includes an external storage unit 4107, an operation unit 4104, a working memory 4106, a controller 4102, an input/output unit 4101, a control signal bus 4103, and a data bus 4105. The external storage unit 4107 stores training data sets 4108 each including input data and teaching data which is a desired inference output, and a fuzzy knowledge base 208. The operation unit 4104 includes a fuzzy inference execution unit 201 for executing fuzzy inference, a fuzzy inference error computation (inference evaluation) unit 204 for computing errors of an inference output, rule, and proposition in accordance with the fuzzy inference output and teaching data, a membership function automatic tuning unit 4108 for automatically tuning a membership function by using errors of each rule and proposition, and a fuzzy rule acquisition unit 205 for acquiring a fuzzy rule based on the error of each rule. The working memory 4106 includes a fuzzy inference storage unit 202 for storing each grade and inference output when executing fuzzy inference and a fuzzy inference error storage unit 204 for storing the errors of an inference output, rule, and proposition. The controller 4102 controls the operation unit 4104 to acquire a fuzzy rule and process a membership function. The control signal bus 4103 transfers a control signal from the controller 4102 to the operation unit 4104. The data bus 4105 transfers data among the operation unit 4104, working memory 4106, and external storage unit 4107. The input/output unit 4101 receives a user input from a keyboard or mouse and displays an output on a display screen.

In the system shown in FIG. 44, the units 201, 203, 4108, and 205 of the operation unit 4104 are formed by hardware, and controlled by the controller 4102. The operation unit may be formed by an unrepresented CPU (central processing unit) and memories (ROM (read only memory) and RAM (random access memory)), and the fuzzy inference execution unit 201, fuzzy inference error computation unit 203, membership function automatic tuning unit 4108, and fuzzy rule acquisition unit 205 may be formed by microprograms or program modules stored in RAM. In this case, the units 201, 203, 4108, and 205 of the operation unit 4104 are controlled by a system program stored in the memory of the operation unit 4104 and the controller 4102 becomes an interface between the input/output unit 4101 and the operation unit 4104. The membership function automatic tuning unit 4108 automatically tunes the shape of a membership function in accordance with the error of each proposition obtained by the extended BP method.

Figure 45:
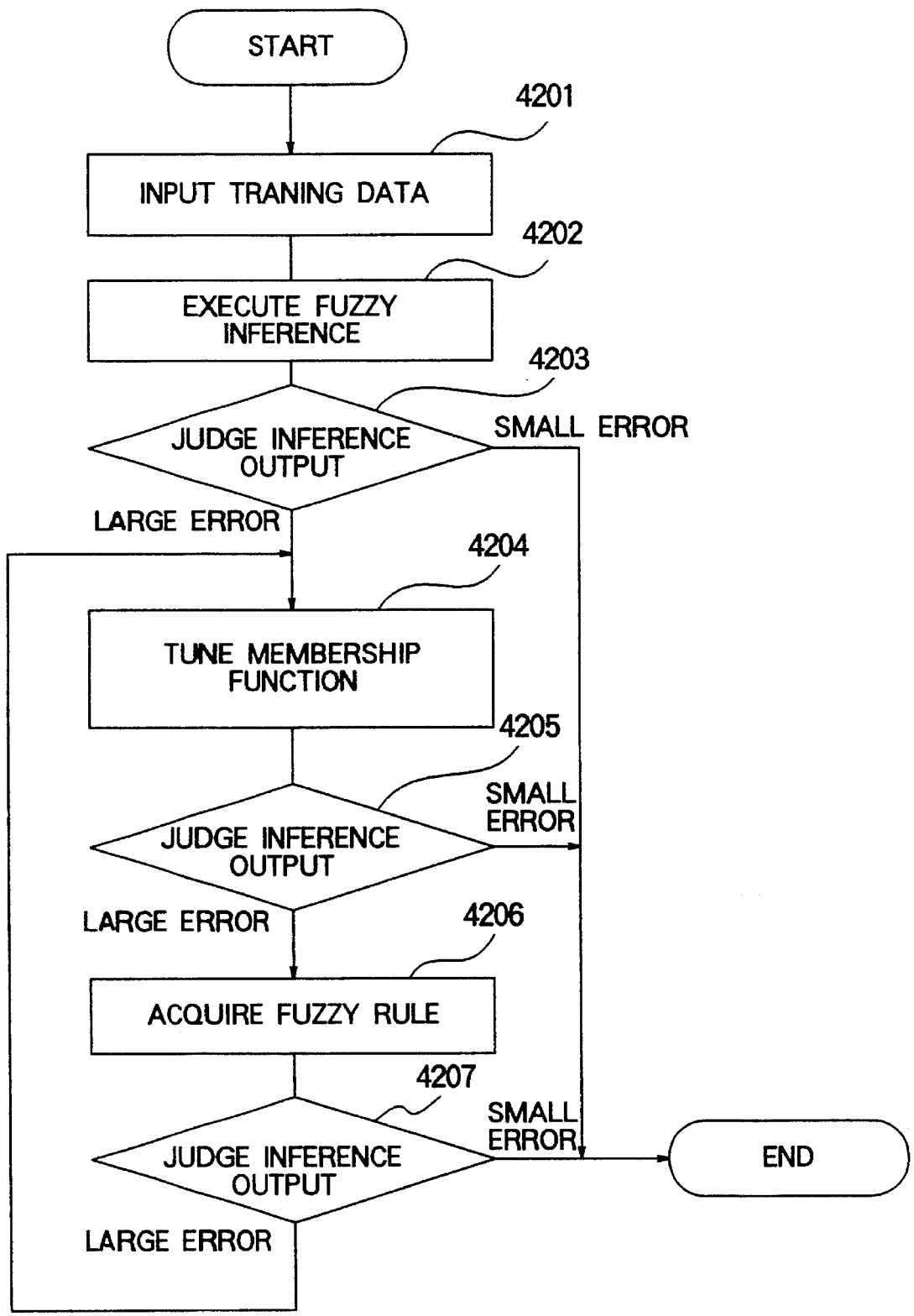
FIG. 45 is a flow chart explaining the operation of the fuzzy inference acquisition apparatus of the third embodiment.

The operation of the fuzzy inference system of this embodiment will be described. A flow chart explaining the operation is shown in FIG. 45. At Step 4201 shown in FIG. 45, training data sets are read from the external storage unit 4107. At Step 4202 the fuzzy inference execution unit 201 executes fuzzy inference and computes an inference output.

After the computation of the inference output, at Step 4203 an inference error is computed by using the teaching data. If the computed inference error is within a predetermined allowance range, the inference operation is terminated. If out of the allowance range, the fuzzy inference is modified to reduce the inference error. This modification includes tuning the shape of at least one membership function and acquiring a rule. Namely, at Step 4204 the shape of at least one membership function is tuned, and at Step 4205 a fuzzy rule is acquired.

Figure 46:
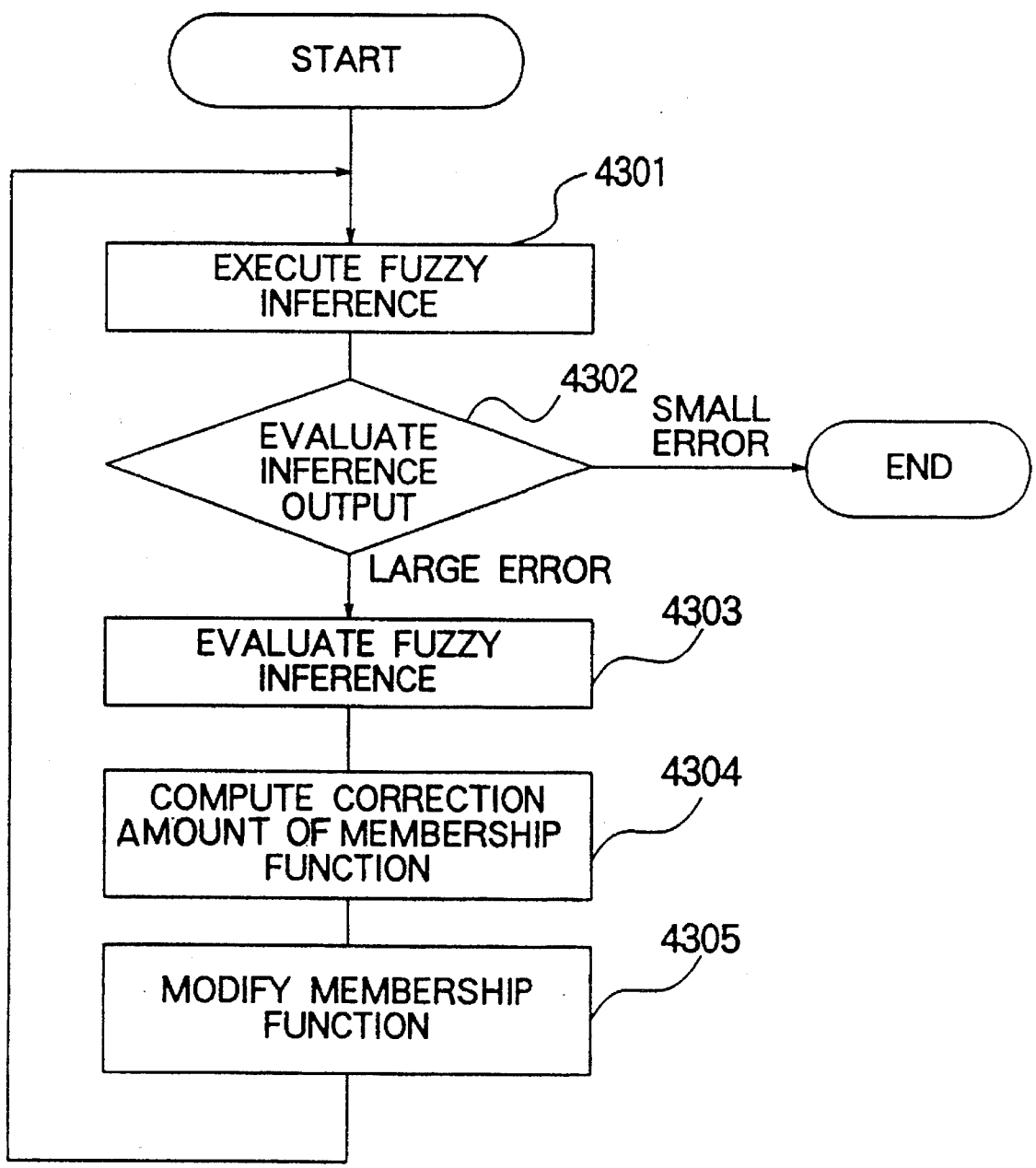
FIG. 46 is a flow chart showing the procedure of membership function automatic tuning used by the third embodiment.

The tuning of a membership function at Step 4204 is detailed in a flow chart shown in FIG. 46. At Step 4301 fuzzy inference is executed. At Step 4302 an inference output is evaluated. If the inference error is within the allowance range, the fuzzy inference is terminated. If not, at Step 4303 a fuzzy inference evaluation is executed to compute the errors of respective rules and propositions in accordance with the inference error. At Step 4304 the error of at least one shape parameter representing the shape of a membership function is computed in accordance with the errors of respective propositions. The error of the at least one shape parameter is computed for all training data sets. The sum of errors is multiplied by a training coefficient, the result being used as a correction amount of the at least one shape parameter. At Step 4305 the correction amount is added to the original at least one shape parameter to modify it.

The correction amount of the shape parameter is set so small that the inference error converges to a minimum value by repeating Steps 4301 to 4305. When the parameter value has converged, the parameter values of the membership function at that time are added to the knowledge base to update them. The shapes of all membership functions may be tuned at a time.

Upon completion of tuning the membership function, the inference error is evaluated at Step 4205. If the fuzzy inference error is still out of the allowance range, a fuzzy rule is acquired in the manner like the above-described embodiments. The errors and grades of each rule and proposition for each training data set have already been computed and stored in the fuzzy inference storage unit 202 and fuzzy inference error storage unit 204 when the membership function has been automatically tuned. Therefore, the fuzzy inference execution and fuzzy inference error computation can be omitted. As described with the first embodiment, in accordance with the grades and errors of each rule and proposition, the knowledge base is updated by the rule addition, modification, and deletion. At each rule acquisition process, necessary data is presented to a user by displaying it on the display screen or the like, and the user request or the like is entered if necessary from a mouse or keyboard.

Each time a rule acquisition is performed, a rule addition, modification, or deletion is executed once. After the rule acquisition, the inference error is evaluated. If the inference error is within the allowance range, the fuzzy inference is terminated. If not, the operation returns to Step 4204 to tune the shape of the membership function.

In this embodiment, the rule acquisition is performed after the tuning of a membership function. The rule acquisition may be performed before the tuning of a membership function, or the rule acquisition and tuning may be performed at the same time.

This embodiment provides an automatic tuning of a membership function in addition to the fuzzy rule acquisition, improving the efficiency in configuring the fuzzy inference system.

Also in this embodiment, part of the method of automatically tuning a membership function and part of the method of acquiring a rule are shared in common, economizing computation resources and time.

Next, the fuzzy inference apparatus applied to a tunnel ventilation control system according to the fourth embodiment of the invention will be described. The fuzzy inference apparatus of this embodiment uses the fuzzy acquisition method described in one of the first to third embodiments.

The object of the roadway tunnel ventilation control system is to control air contamination in the roadway tunnel below a predetermined upper limit. The air contamination by vehicle exhaust gas is controlled by adjusting an output of an exhaust jet fan.

The tunnel ventilation control system includes a unit for predicting the contamination from the present state in the tunnel, and a unit for controlling the output of the jet fan in accordance with the predicted contamination. This structure has resulted from the following reasons. The ventilation effect by the jet fan has a long time constant, and it takes a long time to obtain the actual ventilation effect. In order to make the contamination below the upper limit, it is therefore necessary to drive the jet fan earlier than the contamination reaches the upper limit. However, the period of driving the jet fan is desired to be set as short as possible in order to reduce power consumption. In order to solve this problem, the contamination is predicted. If the predicted contamination exceeds the upper limit, the jet fan is driven, and if not, the jet fan is not driven. Even if the contamination becomes bad temporarily, the jet fan is not driven if the predicted contamination does not exceed the upper limit. In this manner, the power consumption can be reduced.

The fuzzy inference is used by the contamination prediction unit of this system. The source of air contamination in the tunnel is contaminated materials of vehicle exhaust gas. The contamination degree is determined from the amount of contaminated materials, the diffusion effect of contaminated material in air, and the air flow effect in the tunnel. It is not possible, however, to measure correctly the total amount of contaminated materials exhausted from vehicles. In practice, the total amount is estimated from the number of vehicles and their speeds. The correct estimation of air flow in the tunnel is also difficult because there are the jet fan exhaust effect and the effect of pushing air in front of each vehicle. The air flow estimation therefore relies on the number of vehicles and their speeds. Estimation of the contamination degree has many fuzzy variables described above. Therefore, the fuzzy inference is more suitable than a general analytical approach.

Figure 47:
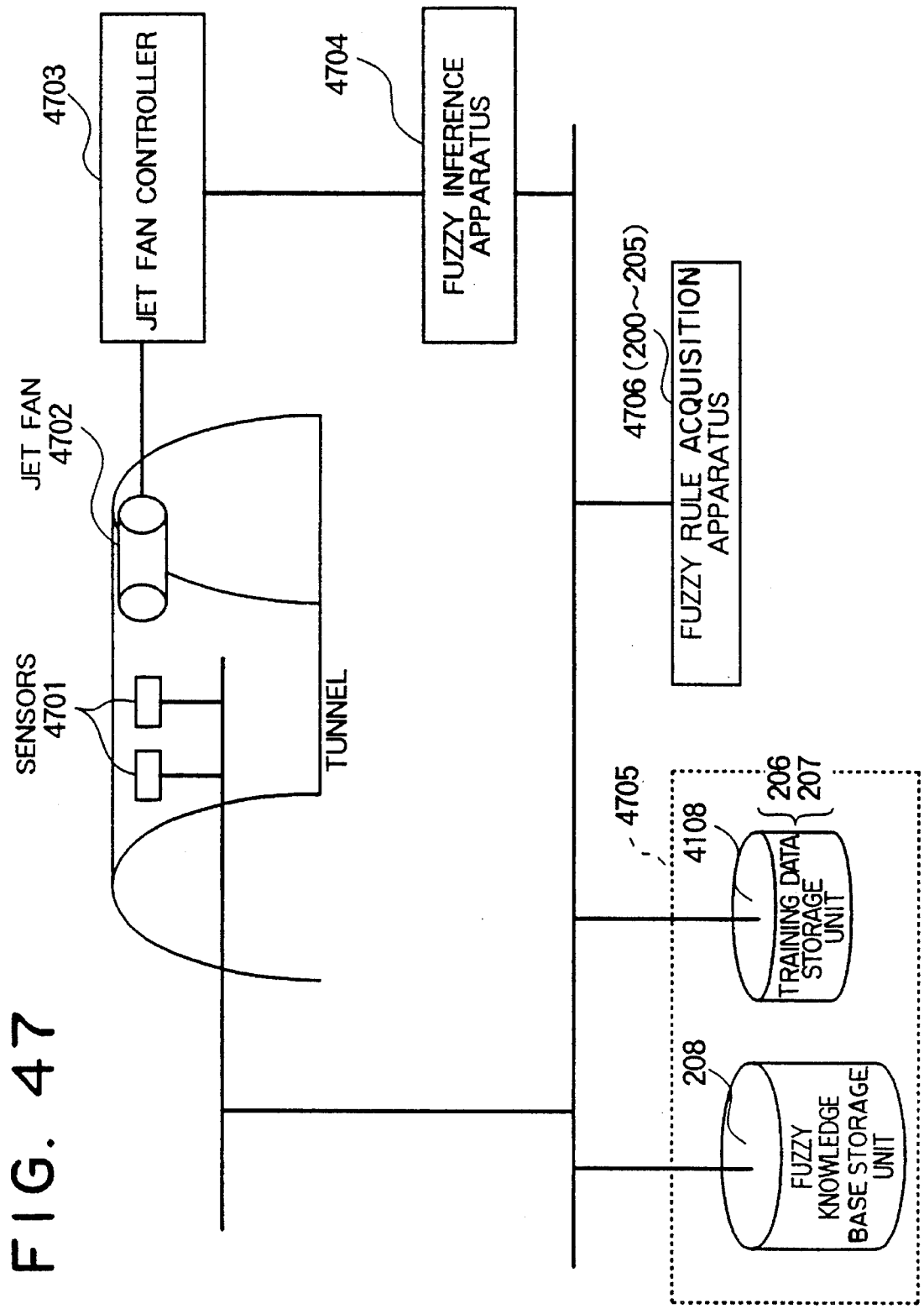
FIG. 47 shows the structure of the fuzzy inference apparatus applied to tunnel ventilation control according to a fourth embodiment of the present invention.

The system structure is shown in FIG. 47. The system includes sensors 4701 mounted in a tunnel, a jet fan 4702, a jet fan controller 4703, a fuzzy inference apparatus 4704, an external storage unit 4705, and a rule acquisition apparatus 4706. The fuzzy inference apparatus 4704 predicts the contamination degree through on-line fuzzy inference by using data of the sensors and a fuzzy knowledge base 208 stored in the external storage unit 4705. The external storage unit 4705 stores on-line the fuzzy knowledge base and data from the sensors as the training data 4108. The rule acquisition apparatus 4706 updates the knowledge base by using off-line the training data 4108 stored in the external storage unit 4705.

The training data 4108 includes input data 206 and teaching data 207. The fuzzy rule acquisition apparatus 4706 includes, for example, the fuzzy control processor 200, fuzzy inference storage unit 202, and fuzzy inference error storage unit 204 of the first embodiment.

The fuzzy rule acquisition apparatus 4706 may include the operation unit 4104, working memory 4106, and controller 4102 of the third embodiment.

The sensors 4701 detect the following data. The air contamination degree is measured by an optical sensor which measures the transmittance of light in air. The data of the sensors include:

the number of vehicles entering the tunnel (Vehicle Number);

the speed of a vehicle entering the tunnel (Vehicle Speed);

the output of the jet fan (Fan); and the air contamination degree in the tunnel (Contamination).

In accordance with these data, a change of the contamination degree after one minute, i.e., a difference from the present value, is predicted by fuzzy inference.

For the fuzzy inference, the fuzzy knowledge, i.e., fuzzy rules and fuzzy membership functions are required. The fuzzy inference is executed to determine the fuzzy rules and fuzzy membership functions.

In this embodiment, the data detected by the sensors is stored in the external storage unit 4705 as the training data 4707. To start the rule acquisition, the following initial rules are set to the fuzzy knowledge base 208.

IF (Vehicle Number is large) THEN (Contamination increases).

IF (Vehicle Number is medium) THEN (Contamination does not change).

IF (Vehicle Number is small) THEN (Contamination decreases).

IF (Vehicle Speed is high) THEN (Contamination increases).

IF (Vehicle Speed is medium) THEN (Contamination does not change).

IF (Vehicle Speed is low) THEN (Contamination decreases).

IF (Fan rotates) THEN (Contamination decreases).

IF (Fan stops) THEN (Contamination does not change).

These rules have been determined by neglecting the interaction between the input variables. Although the detailed description is omitted, a proper membership function is assigned to each of "large", "high", "medium", "small", "low", "increases", "decreases", and "does not change", and is stored in the fuzzy knowledge base 208 together with the rules. Rules are acquired from these initial rules by using the third embodiment method. As the input data and teaching data, the data from the sensors stored in the external storage unit is used. In this embodiment, the rule acquisition apparatus 4706 acquires a rule by using the fuzzy knowledge base 208 and the training data 4707 including the input data and teaching data, and updates the fuzzy rules and membership functions stored in the fuzzy knowledge base 208.

Necessary data obtained during the rule acquisition by the rule acquisition apparatus 4706 is displayed on the input/output unit such as a display unit of the apparatus as shown in FIG. 48. The displayed data includes the input data and teaching data from which a rule is acquired and the modification of fuzzy rules.

Some of fuzzy rules acquired by the rule acquisition apparatus are given in the following.

IF (Vehicle Number is large AND Vehicle Speed is high AND Fan stops) THEN (Contamination does not change).

IF (Vehicle Number is large AND Vehicle Speed is medium AND Fan stops) THEN (Contamination increases).

IF (Vehicle Number is large AND Vehicle Speed is low AND Fan stops) THEN (Contamination increases).

IF (Vehicle Number is medium AND Vehicle Speed is high AND Fan stops) THEN (Contamination decreases).

IF (Vehicle Number is medium AND Vehicle Speed is medium AND Fan stops) THEN (Contamination does not change).

IF (Vehicle Number is medium AND Vehicle Speed is low AND Fan stops) THEN (Contamination decreases).

IF (Vehicle Number is small AND Fan stops) THEN (Contamination does not change).

IF (Fan rotates) THEN (Contamination decreases).

Although the initial rules have been determined by neglecting the interaction of the input variables, the rules considering the interaction can be acquired by the rule acquisition apparatus of this embodiment.

The fuzzy knowledge obtained as above is stored in the fuzzy knowledge base 208. The fuzzy inference apparatus 4704 refers to the fuzzy knowledge to execute on-line fuzzy inference for the data from the sensors and predict a change in air contamination. The predicted change is transferred to the controller 4703 of the jet fan. If it is predicted that the contamination degree will exceed the upper limit, the jet fan 4702 is rotated to ventilate air.

As described above, fuzzy rules can be acquired easily and the efficiency in configuring the tunnel ventilation control system can be improved.

What is claimed is:

1. A fuzzy rule acquisition method for a fuzzy inference system in which a fuzzy inference is achieved based on a fuzzy knowledge including fuzzy rules, each of the fuzzy rules described in a format having an IF part and a THEN part, and membership functions defining meanings of propositions described in the IF part and the THEN part, said fuzzy rule acquisition method comprising the steps of:

(a) executing a fuzzy inference for at least one input value by using said fuzzy rules of said fuzzy knowledge, and obtaining a result of the execution of the fuzzy inference;

(b) comparing the result of the execution of the fuzzy inference with a teaching value, and obtaining an inference error;

(c) obtaining errors of said fuzzy rules by using said inference error by referring to at least one of combinations of IF parts of said fuzzy rules, combinations of THEN parts of said fuzzy rules, and both of the combinations of the IF part and the THEN part of said fuzzy rules;

(d) determining whether a pair of said fuzzy rules are mutually contradictory, based on a pair of errors corresponding to said pair of fuzzy rules, by comparing the errors of each pair of fuzzy rules among all pairs of said fuzzy rules;

(e) determining each pair of fuzzy rules as contradictory rules if a ratio between the errors of each pair of fuzzy rules is within a predetermined range and one of the errors is negative and the other of the errors is positive;

(f) modifying a fuzzy rule determined as contradictory to dissolve the contradiction by comparing the areas corresponding to the IF parts of each pair of fuzzy rules determined as contradictory and modifying the IF part of the fuzzy rule determined as having a larger area by the comparison result.

2. A fuzzy rule acquisition method according to claim 1, further comprising:

a step of determining that there is a missing fuzzy rule if said step (d) determines that there is no contradiction for all of said fuzzy rules.

3. A fuzzy rule acquisition method according to claim 2, further comprising the seeps of:

obtaining at least one of the errors and at least one of grades of said propositions based on said inference error by referring to at least one of combinations of IF parts of said fuzzy rules, combinations of THEN parts of said fuzzy rules, and both of the combinations of the IF parts and the THEN parts of said fuzzy rules; and if it is determined that there is a missing fuzzy rule, generating said missing fuzzy rule based on at least one of the errors and grades of said propositions.

4. A fuzzy rule acquisition method according to claim 2, further comprising the steps of:

obtaining at least one of the errors and grades of said propositions based on said inference error by referring to at least one of combinations of IF parts of said fuzzy rule, combinations of THEN parts of said fuzzy rules, and both of the combinations of the IF parts and the THEN parts of said fuzzy rules;

if it is determined that there is a missing rule, selecting IF parts based on at least one of the errors and grades of the propositions of said respective IF parts of said fuzzy rules; and coupling said selected IF parts to generate the IF part of said missing fuzzy rule.

5. A fuzzy rule acquisition method according to claim 2, further comprising the steps of:

obtaining the errors of said respective propositions based on said inference error by referring to at least one of combinations of IF parts of said fuzzy rules, combinations of THEN parts of said fuzzy rules, and both of the combinations of the IF parts and the THEN parts of said fuzzy rules;

if it is determined that there is a missing rule, selecting a THEN part based on the errors of the propositions of said respective THEN parts of said fuzzy rules; and determining said selected THEN part as the THEN part of said missing fuzzy rule.

6. A fuzzy rule acquisition method according to claim 1, further comprising:

a step of determining as a redundant fuzzy rule a fuzzy rule among said fuzzy rules not used for the fuzzy inference, and deleting said fuzzy rule determined as the redundant fuzzy rule.

7. A fuzzy rule acquisition method for a fuzzy inference system in which a fuzzy inference ms achieved based on a fuzzy knowledge including fuzzy rules each of the fuzzy rules described in a format having an IF part and a THEN part, and membership functions defining meanings of propositions described in the IF part and the THEN part, said fuzzy rule acquisition method comprising the steps of:

(a) executing a fuzzy inference for at least one input value by using said fuzzy rules of said fuzzy knowledge, and obtaining a result of the execution of the fuzzy inference;

(b) comparing the result of the execution of the fuzzy inference with a teaching value, and obtaining an inference error;

(c) obtaining errors of said fuzzy rules by using said inference error by referring to at least one of combinations of IF parts of said fuzzy rules, combinations of THEN parts of said fuzzy rules, and both of the combinations of the IF part and the THEN part of said fuzzy rules;

(d) determining whether a pair of said fuzzy rules are mutually contradictory, based on a pair of errors corresponding to said pair of fuzzy rules by comparing the errors of each pair of fuzzy rules among all pairs of said fuzzy rules;

(e) determining each pair of fuzzy rules as contradictory fuzzy rules if a ratio between the errors of each pair of the fuzzy rules is within a predetermined range and one of the errors is negative and the other of the errors is positive;

(f) modifying a fuzzy rule determined as contradictory to dissolve the contradiction by comparing the areas corresponding to the IF parts of each pair of fuzzy rules determined as contradictory and modifying the IF part of the fuzzy rule determined as having a larger area by the comparison result;

(g) determining that there is a missing fuzzy rule if said step (d) determines that there is no contradiction for all of said fuzzy rules;

(h) obtaining at least one of the errors and grades of said respective propositions based on said inference error by referring to at least one of combinations of IF parts of said fuzzy rules, combinations of THEN parts of said fuzzy rules, and both of the combinations of the IF parts and the THEN parts of said fuzzy rules;

(i) if it is determined that there is a missing fuzzy rule, generating said missing fuzzy rule based on at least one of the errors and at least one of grades of said propositions;

displaying said generated missing fuzzy rule on a display means; and selectively displaying at least one of the errors and grades of said propositions used when generating said missing fuzzy rule, on said display means.

8. A fuzzy rule acquisition method for a fuzzy inference system in which a fuzzy inference is achieved based on a fuzzy knowledge including fuzzy rules each described in a format having an IF part and a THEN part, and membership functions defining meanings of propositions described in the IF part and THEN part, said fuzzy rule acquisition method comprising the steps of:

(a) acquiring a fuzzy rule by using a procedure of tuning at least one of said membership functions and a fuzzy rule acquisition method comprised of, (i) performing a fuzzy inference for at least one input value by using said fuzzy rules of said fuzzy knowledge, and obtaining a result of the execution of the fuzzy inference, (ii) comparing the result of the execution of the fuzzy inference with a teaching value, and obtaining an inference error, (iii) obtaining errors of said fuzzy rules and one of the errors and at least one of grades of said propositions by using said inference error, (iv) determining whether each of said fuzzy rules is contradictory or is missing, based on the errors of corresponding rules of said fuzzy rules, (v) modifying a fuzzy rule determined as contradictory to dissolve the contradiction, and (vi) if it is determined that there is a missing fuzzy rule, generating said missing fuzzy rule based on at least one of the errors and grades of said propositions;

wherein said procedure of tuning at least one of said membership functions comprises the steps of, (A) performing a fuzzy inference for at least one input value by using said fuzzy rules of said fuzzy knowledge, and obtaining a result of the execution of the fuzzy inference, (B) comparing the result of the execution of the fuzzy inference with a teaching value, and obtaining an inference error, (C) obtaining errors of said propositions by using said inference error by referring to at least one of IF parts of said fuzzy rules, combinations of THEN parts of said fuzzy rules, and both of the combinations of the IF parts and the THEN parts of said fuzzy rules, (D) obtaining a correction amount of a shape parameter of at least one of said membership functions based on the errors of said propositions, (E) tuning the shape of said at least one of said membership functions based on said correction amount, (F) after executing said fuzzy rule acquisition method, executing one of modifying the fuzzy rule determined as contradictory and generating said missing fuzzy rule, (G) after said step (F), executing the procedure of tuning at least one of said membership functions, and (H) repeating said steps (F) and (G) until said interference error becomes small.

9. A fuzzy rule acquisition method according to claim 8, wherein after performing the procedure of tuning at least one of said membership functions, said fuzzy rule acquisition method is executed by using said at least one tuned membership function of said membership functions.

10. A fuzzy rule acquisition method according to claim 8, wherein after said fuzzy rule acquisition method is executed, the procedure of tuning at least one of said membership functions is executed.

11. A fuzzy rule acquisition method for a fuzzy inference system in which a fuzzy inference is achieved based on fuzzy knowledge including fuzzy rules each described in a format having an IF part and a THEN part, and membership functions defining meanings of propositions described in the IF part and THEN part, said fuzzy rule acquisition method comprising the steps of:

(a) acquiring a fuzzy rule by using a procedure of tuning at least one of said membership functions and a fuzzy rule acquisition method comprised of, (i) performing a fuzzy inference for at least one input value by using said fuzzy rules of said fuzzy knowledge, and obtaining a result of the execution of the fuzzy inference, (ii) comparing the result of the execution of the fuzzy inference with a teaching value, and obtaining an inference error, (iii) obtaining errors of said fuzzy rules and at least one of the errors and at least one of grades of said propositions by using said inference error, (iv) determining whether each of said fuzzy rules is contradictory or is missing, based on the errors of corresponding rules of said fuzzy rules, (v) modifying a fuzzy rule determined as contradictory to dissolve the contradiction, and (vi) if it is determined that there is a missing fuzzy rule, generating said missing fuzzy rule based on at least one of the errors and grades of said propositions;

wherein said procedure of tuning at least one of said membership functions comprises the steps of, (A) performing a fuzzy inference for at least one input value by using said fuzzy rules of said fuzzy knowledge, and obtaining a result of the execution of the fuzzy inference, (B) comparing the result of the execution of the fuzzy inference with a teaching value, and obtaining an inference error, (C) obtaining errors of said propositions by using said inference error by referring to at least one of IF parts of said fuzzy rules, combinations of THEN parts of said fuzzy rules, and both of the combinations of the IF parts and the THEN parts of said fuzzy rules, (D) obtaining a correction amount of a shape parameter of at least one of said membership functions based on the errors of said propositions, (E) tuning the shape of said at least one of said membership functions based on said correction amount, (F) executing the procedure of tuning at least one of said membership functions, (G) after said step (F), executing one of modifying the fuzzy rule determined as contradictory and generating said missing fuzzy rule, and (H) repeating said steps (F) and (G) until said inference error becomes small.

12. A fuzzy rule acquisition apparatus for a fuzzy inference system in which a fuzzy inference is achieved based on a fuzzy knowledge stored in a knowledge base storage unit, said fuzzy knowledge including fuzzy rules each described in a format having an IF part and a THEN part, and membership functions defining meanings of propositions described in the IF part and the THEN part, said fuzzy rule acquisition apparatus comprising:

fuzzy inference execution means for performing a fuzzy inference for at least one input value by using said fuzzy rules of said fuzzy knowledge stored in said knowledge base storage unit, and obtaining a result of the execution of the fuzzy inference;

fuzzy inference storage means for storing the execution result of the fuzzy inference;

means for comparing the result of the execution of the fuzzy inference with a teaching value, and obtaining an inference error;

means for obtaining errors of said fuzzy rules by using said inference error by referring to at least one of combinations of IF parts of said fuzzy rules, combinations of THEN parts of said fuzzy rules, and both of the combinations of the IF parts and THEN parts of said fuzzy rules;

fuzzy inference error storage means for storing said obtained errors of said fuzzy rules;

contradiction determining means for determining whether a pair of said fuzzy rules are mutually contradictory, based on a pair of errors corresponding to said pair of fuzzy rules stored in said fuzzy inference storage unit;

means for modifying a fuzzy rule determined as contradictory by referring to said fuzzy knowledge stored in said knowledge base storage unit;

means for rewriting said fuzzy rule in said knowledge base storage unit determined as contradictory into said modified fuzzy rule;

means for obtaining at least one of the errors and grades of said propositions based on said inference error by referring to at least one of combinations of IF parts of said fuzzy rules, combination of THEN parts of said fuzzy rules, and both of the combinations of the IF parts and THEN parts of said fuzzy rules and storing said at least one in said fuzzy inference storage unit;

means for determining that there is a missing fuzzy rule if said contradiction determining means judges that there is no contradiction for all said fuzzy rules, and for generating said missing fuzzy rule as new combinations of said propositions based on at least one of the errors and grades of said propositions stored in said fuzzy inference error storage unit; and means for adding said generated missing fuzzy rule to said knowledge base storage unit.

13. A fuzzy rule acquisition apparatus according to claim 12, wherein said means for modifying a fuzzy rule modifies the fuzzy rule by changing combinations of IN pares of said fuzzy rules, combinations of THEN parts of said fuzzy rules, or both the combinations IF parts and THEN parts of said fuzzy rules.

14. A fuzzy rule system in which a fuzzy inference is achieved based on a fuzzy knowledge stored in a knowledge base storage unit, said fuzzy knowledge including fuzzy rules each described in a format having an IF part and a THEN part, and membership functions defining meanings of propositions described in the IF part and the THEN part, said fuzzy rule acquisition system comprising:

fuzzy inference execution means for performing a fuzzy inference for at least one input value by using said fuzzy rules of said fuzzy knowledge stored in said knowledge base storage unit, and obtaining a result of the execution of the fuzzy inference;

fuzzy inference storage means for storing the execution result of the fuzzy inference;

means for comparing the result of the execution of the fuzzy inference with a teaching value, and obtaining an inference error;

means for obtaining errors of said fuzzy rules by referring to at least one of combinations of IF parts of said fuzzy rules, combinations of THEN parts of said fuzzy rules, and both of the combinations of the IF parts and THEN parts of said fuzzy rules using said inference error;

fuzzy inference error storage means for storing said obtained errors of said fuzzy rules;

contradiction determining means for determining whether a pair of said fuzzy rules are mutually contradictory, based on a pair of errors of corresponding rules of said fuzzy rules stored in said fuzzy inference storage unit;

means for modifying a fuzzy rule determines as contradictory by using the errors of said fuzzy rules stored said fuzzy inference error storage unit;

means for rewriting said fuzzy rule in said knowledge base storage unit determined as contradictory into said modified fuzzy rule;

a fuzzy inference unit for performing a fuzzy inference and delivering an inference output, by using input data and said fuzzy knowledge stored in said knowledge base storage unit;

means for obtaining ones of the errors and grades of said propositions based on said inference error by referring to at least one of combinations of IF parts of said fuzzy rules, combinations of THEN parts of said fuzzy rules, and both of the combinations of the IF Darts and THEN parts of said fuzzy rules and storing said at least one in said fuzzy inference storage unit;

means for determining that there is a missing fuzzy rule if said contradiction determining means judges that there is no contradiction for all said fuzzy rules, and for generating said missing fuzzy rule as new combinations of said propositions based on ones of the errors and grades of said propositions stored in said fuzzy inference error storage unit; and means for adding said generated missing fuzzy rule to said knowledge base storage unit.

15. A fuzzy rule acquisition method according to claim 14, wherein said means for modifying a fuzzy rule modifies the fuzzy rule by changing combinations of IF parts of said fuzzy rules, combinations of THEN pares of said fuzzy rules, or both the combinations IF parts and THEN parts of said fuzzy rules.

* * * * *

UNITED STATES PATENT AND TRADEMARK OFFICE
CERTIFICATE OF CORRECTION

PATENT NO. : 5,487,130
DATED : January 23, 1996
INVENTOR(S) : Toshihide Ichimori, et al.

It is certified that error appears in the above-indentified patent and that said Letters Patent is hereby corrected as shown below:

Claim 1, column 27, line 4, after "contradictory" insert --fuzzy--.

Claim 7, column 27, line 66, delete "ms" and insert therefor --is--.

Claim 13, column 31, line 27, delete "IN pares" and insert therefor --IF parts--.

Claim 14, column 32, line 12, delete "determines" and insert therefor --determined--.

Claim 14, column 32, line 13, after "stored" insert --in--.

Claim 14, column 32, line 26, delete "Darts" and insert therefor --parts--.

Signed and Sealed this

Twenty-third Day of April, 1996

Attest:

BRUCE LEHMAN

Attesting Officer

Commissioner of Patents and Trademarks